(12) United States Patent
Lipscomb et al.

(10) Patent No.: US 9,572,323 B2
(45) Date of Patent: *Feb. 21, 2017

(54) INTERCHANGEABLE FLOW DIRECTING ORIFICE INSERTS AND RECIRCULATING PET FOUNTAIN WITH FLOW DIRECTING ORIFICE INSERTS

(71) Applicant: Pioneer Pet Products, LLC, Cedarburg, WI (US)

(72) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 270 days.

This patent is subject to a terminal disclaimer.

(21) Appl. No.: 14/021,396

(22) Filed: Sep. 9, 2013

(65) Prior Publication Data

US 2014/0069341 A1 Mar. 13, 2014

Related U.S. Application Data

(60) Provisional application No. 61/698,691, filed on Sep. 9, 2012.

(51) Int. Cl.
*A01K 7/00* (2006.01)
*A01K 7/02* (2006.01)

(52) U.S. Cl.
CPC ........................ *A01K 7/02* (2013.01)

(58) Field of Classification Search
CPC .......... A01K 7/02; A01K 7/00; A01K 45/002; A01K 39/026; A01K 39/02; A01K 39/024
USPC ......... 119/74, 72, 51.5, 61.5, 77, 78, 79, 80; 239/16, 17
See application file for complete search history.

(56) References Cited

U.S. PATENT DOCUMENTS

| | | | |
|---|---|---|---|
| 5,501,178 A | 3/1996 | Kemp | |
| 6,257,560 B1 | 7/2001 | Kim | |
| 6,460,483 B1 * | 10/2002 | Northrop | A01K 7/00 119/702 |
| 6,640,483 B2 | 11/2003 | Nelson | |
| 7,089,881 B2 | 8/2006 | Plante | |
| 7,270,082 B2 * | 9/2007 | Plante | A01K 7/022 119/74 |
| D643,158 S | 8/2011 | Lipscomb et al. | |
| 8,171,885 B1 | 5/2012 | Northrop et al. | |
| 8,261,696 B1 | 9/2012 | Lipscomb et al. | |
| 8,381,685 B2 * | 2/2013 | Lipscomb | A01K 45/002 119/74 |
| 8,763,557 B2 * | 7/2014 | Lipscomb | A01K 7/02 119/74 |

(Continued)

*Primary Examiner* — Trinh Nguyen
(74) *Attorney, Agent, or Firm* — Boyle Fredrickson S.C.

(57) ABSTRACT

A recirculating pet fountain having a cover mounted on a basin in a manner that removably seats the cover on the basin. An inclined spillway of the cover has an intake-defining edge below water in the basin producing a spillway that also is a debris and detritus blocking barrier. The fountain includes at least one removable orifice insert having a mounting stem received in an opening in the cover and a head from which water exits. Interchangeable inserts can be provided with one insert directing a water stream out a nozzle onto the spillway or into water in a bowl disposed below the insert that can be a drinking well. Another insert can be a flow dividing insert splitting flow into a plurality of streams.

36 Claims, 15 Drawing Sheets

(56) References Cited

U.S. PATENT DOCUMENTS

| | | | |
|---|---|---|---|
| 8,770,148 B2* | 7/2014 | Lipscomb | A01K 7/02 119/74 |
| 8,800,494 B2* | 8/2014 | Lipscomb | A01K 7/02 119/74 |
| 8,813,683 B2* | 8/2014 | Lipscomb | A01K 7/02 119/74 |
| 8,899,182 B2* | 12/2014 | Lipscomb | A01K 7/02 119/72 |
| 8,985,054 B2* | 3/2015 | Lipscomb | A01K 45/002 119/74 |
| 2005/0166853 A1* | 8/2005 | Plante | A01K 7/02 119/74 |
| 2008/0078330 A1 | 4/2008 | McCallum et al. | |
| 2010/0024738 A1 | 2/2010 | Chen et al. | |
| 2010/0095897 A1 | 4/2010 | Rowe | |
| 2010/0300366 A1* | 12/2010 | Lipscomb | A01K 45/002 119/74 |
| 2011/0067638 A1 | 3/2011 | Lipscomb et al. | |
| 2011/0259273 A1 | 10/2011 | Lipscomb et al. | |
| 2012/0137979 A1 | 6/2012 | Lipscomb et al. | |
| 2013/0036981 A1 | 2/2013 | Lipscomb et al. | |
| 2013/0174790 A1 | 7/2013 | Lipscomb | |
| 2013/0180458 A1 | 7/2013 | Lipscomb et al. | |
| 2013/0255584 A1 | 10/2013 | Lipscomb et al. | |

\* cited by examiner

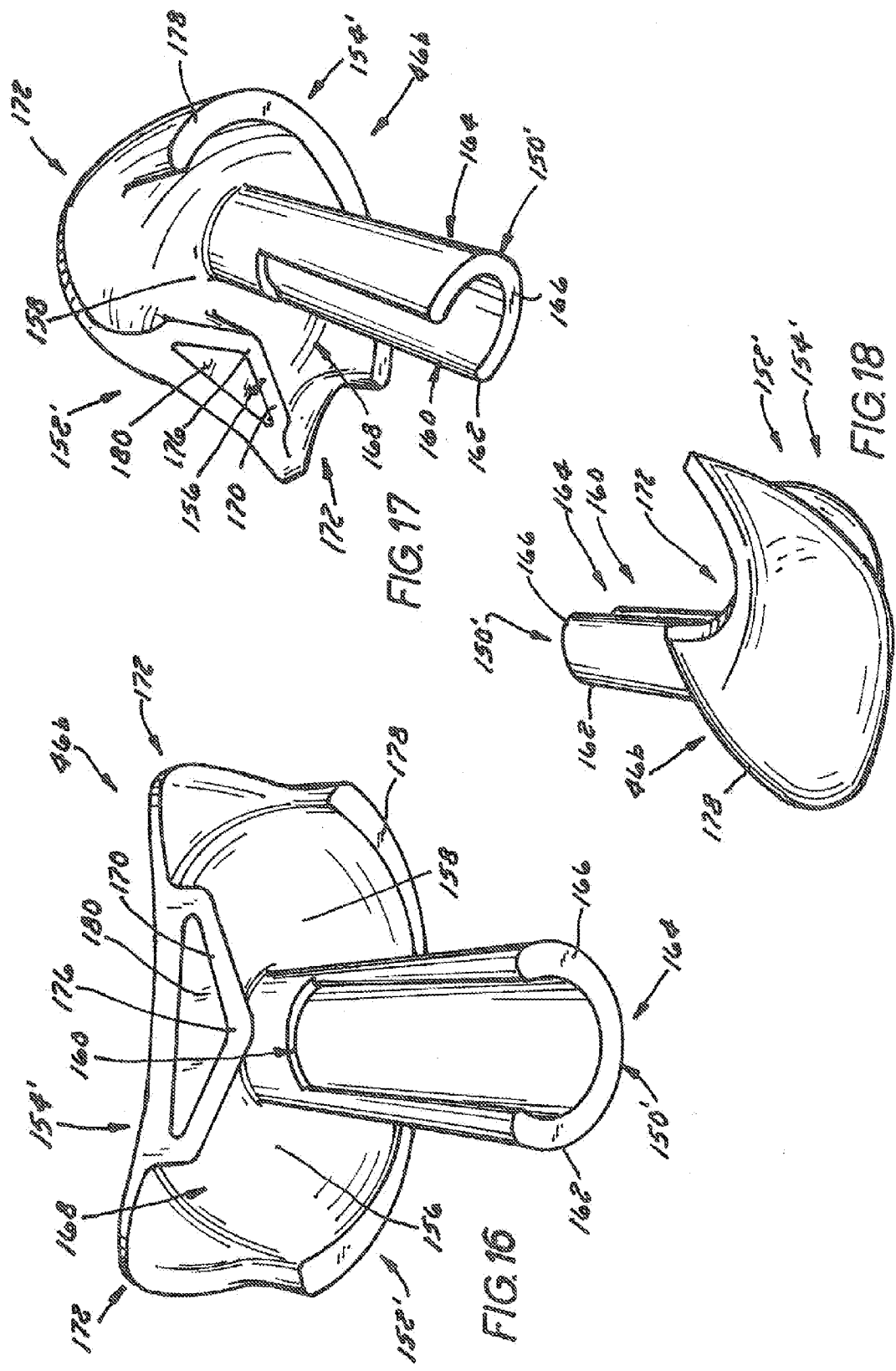

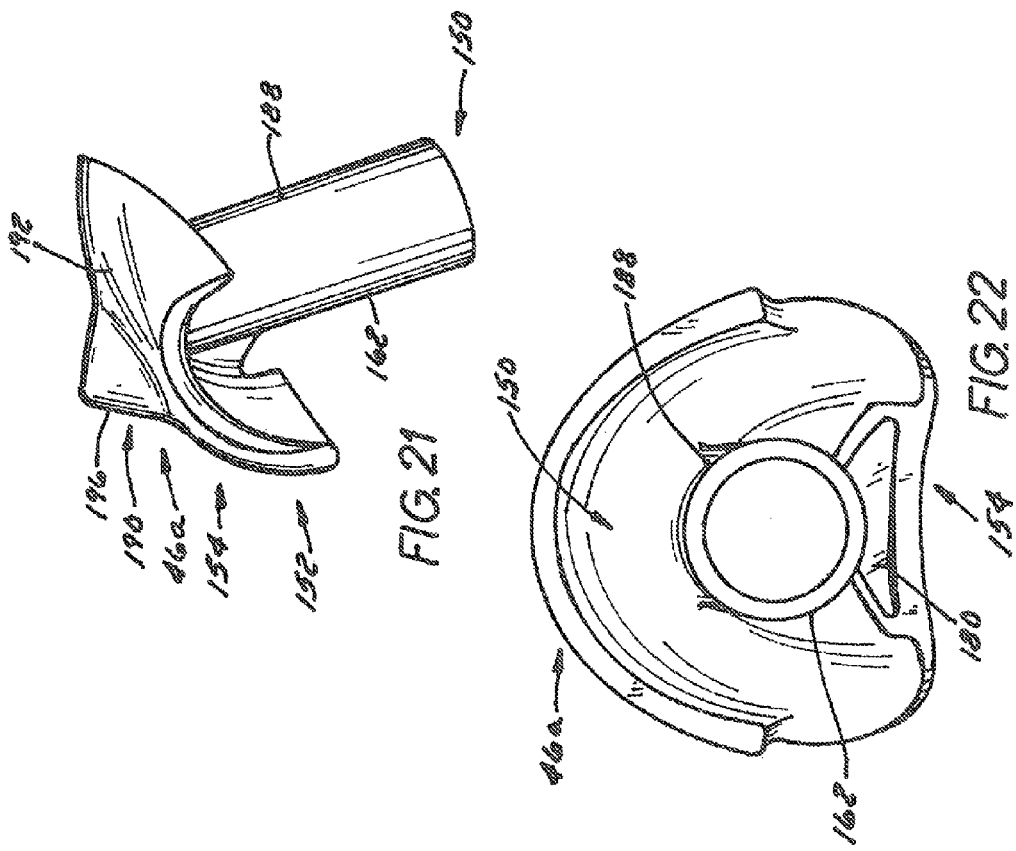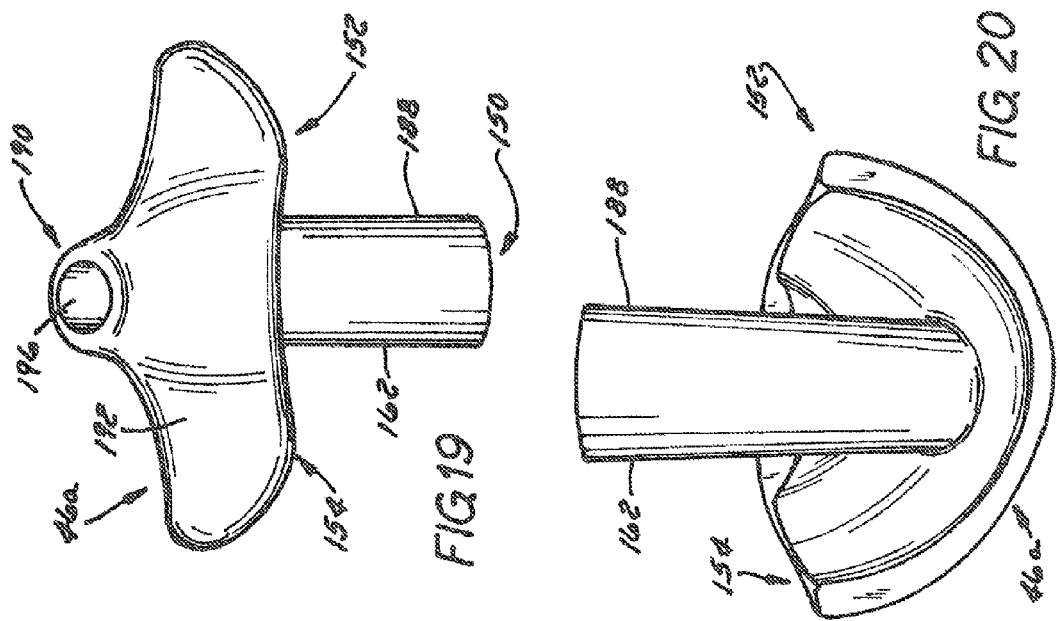

INTERCHANGEABLE FLOW DIRECTING ORIFICE INSERTS AND RECIRCULATING PET FOUNTAIN WITH FLOW DIRECTING ORIFICE INSERTS

CROSS REFERENCE

This application claims priority in U.S. Provisional Patent Application No. 61/698,691, filed Sep. 9, 2012, the entirety of which is hereby expressly incorporated herein by reference.

FIELD

The present invention relates generally to interchangeable flow directing orifice inserts for a pet watering device and a pet watering device capable of using interchangeable flow directing inserts and more particularly to such orifice inserts for a recirculating pet fountain and recirculating pet fountain including a plurality of such orifice inserts.

BACKGROUND

While animal and pet watering devices have enjoyed considerable commercial success, improvements nonetheless remain desirable. While recirculating pet fountains have particularly enjoyed commercial success, they tend to accumulate debris and other detritus which can clog its filter which hi turn can block flow of water to its pump ceasing fountain operation. In addition, some pet fountains have been touted as being non-splashing teaching the undesirability of water splashing during operation and other pet fountains have employed splashing water during operation in effect teaching the desirability of splashing.

What is needed is an improved recirculating pet fountain that addresses one or more of the above issues.

SUMMARY

The present invention is directed to an animal or pet watering device configured to accommodate a plurality of different flow configurations and which can include a cover configured to block at least some debris and detritus that accumulates in water recirculating in the fountain over time helping to prevent clogging of a filter of the fountain as well as obstruction of water flow to a water-recirculating pump of the fountain. The fountain can include a cover that can be configured to help couple with the pump during assembly.

The present invention also is directed to a plurality of discharge orifices configured for use with a recirculating pet fountain that each have different flow characteristics and/or liquid discharge configuration enabling selection and use of a particular one of the plurality of discharge orifices in a recirculating pet fountain based on the desired flow characteristics and/or discharge configuration provided by the selected orifice. The plurality of different discharge orifices can be interchangeable thereby enabling selection and installation of a first one of the plurality of discharge orifices based on the flow characteristics and/or discharge configuration of the first discharge orifice which can subsequently be removed and replaced with a second one of the plurality of discharge orifices based on the flow characteristics and/or discharge configuration of the second discharge orifice that differ from the first discharge orifice.

In one preferred discharge orifice implementation, a plurality of different discharge orifices are provided with a first discharge orifice configured to discharge a stream of water therefrom at an angle relative to the fountain where the stream can travel through the air before impinging against part of the fountain or falling in water being recirculated by the fountain and a second discharge orifice configured to discharge a plurality of spaced apart streams of water therefrom in different directions that can flow along part of the fountain before reaching water being recirculated by the fountain. Such a preferred discharge orifice implementation can include a third discharge orifice that can include elements of the first and second discharge orifices producing a discharge orifice having a nozzle from which a stream of water can be discharged into the air and a plurality of additional streams of water that can be discharged in a manner where the water streams flow along part of a cover of the fountain. If desired, each discharge orifice can be configured as an insert that can be removably inserted into a receptacle formed in part of the fountain that is in liquid flow communication with the recirculating fountain pump.

A preferred animal or pet watering device configured in accordance with the present invention is a recirculating pet fountain well suited for indoor use to provide water to dogs, cat, reptiles and the like that can include at least one of the plurality of different discharge orifices and preferably includes more than one of the plurality of different discharge orifices. In a preferred embodiment, such a recirculating pet fountain is shipped as an assembly that includes a plurality of different discharge orifices enabling a purchaser or user to select a desired one of the plurality of different discharge orifices based on the specific desired flow characteristics and/or discharge configuration of the discharge orifice selected by the user. Each one of the plurality of different discharge orifices are removable enabling them to be interchangeable during the course of use and operation of the recirculating pet fountain.

One suitable recirculating pet fountain has a water-holding fountain basin that carries a removably seated fountain cover overlying part of the basin in which the pump is disposed. A preferred embodiment of the fountain cover can be configured with an intake disposed below the surface of water in the basin that prevents at least some water-borne debris and detritus that accumulates over time during fountain operation from reaching the pump and any filter disposed between the intake and pump. Such an intake can be integrally formed of part of a spillway of the cover along which water flows during fountain operation before returning to the basin. Such an intake can be integrally formed in a fountain cover that extends between opposite sides of the basin when mounted to the basin helping not only to locate the cover during assembly but also preventing side-to-side movement of the cover relative to the basin during fountain use and operation.

One preferred pet watering device is a recirculating pet fountain having a basin in which a cover is seated that overlies a pump in liquid-flow communication with one of a plurality of discharge orifice inserts that is removably engaged with the cover that directs a flow of water discharged by the pump onto one of the cover and an open drinking well of the basin depending on the flow characteristics and/or discharge characteristics of the particular one of the plurality of discharge orifice inserts engaged with the cover. The basin has a bottom wall from which an endless sidewall extends about the periphery of the bottom wall defining a substantially enclosed sump underneath the cover on one side of the cover and an open drinking well on the other side of the cover. The basin sidewall terminates in a top edge of the basin that extends about the periphery of the basin sidewall. The basin can include a pump seat in which a submersible pump or pump-holding module can be releasably mounted. The basin can have a divider extending between opposite sides of the basin sidewall configured to releasably receive a replaceable filter disposed upstream of the pump.

The fountain cover can be configured to include a spillway with the cover extending between opposite sides of the basin sidewall with a preferred embodiment of the spillway being inclined toward the bottom of the basin and having a bottom edge offset or spaced from the basin bottom defining the intake therebetween that enables water in the open drinking well of the basin to flow underneath the cover into the sump and toward the pump. In one preferred embodiment, at least a portion of the spillway extends from one side of the basin to the other side of the basin. In another preferred embodiment, the spillway extends from one part of the basin sidewall that defines one side of the basin to another part of the basin sidewall that defines an opposite or other side of the basin from the top of the basin sidewall along each side to adjacent a bottom of the basin.

The cover has a pair of spaced apart outer side edges that each substantially conforms to a contour of an adjacent portion of the basin sidewall with at least one side edge extending downwardly to the basin bottom wall defining a foot resting on the basin bottom offsetting at least a portion of the bottom edge extend outwardly away from the foot above the basin bottom defining the intake. In a preferred embodiment, each side edge conforms to an adjacent part of the sidewall that is curved along at least one of and preferably both of a longitudinal and vertical extent or direction. In such a preferred embodiment, each side edge can extend downwardly to the basin bottom defining a foot that can rest on the basin bottom spacing the bottom edge of the cover extending between each foot from the basin bottom far enough to define the intake. The bottom edge is positioned between a maximum fill line of the basin and the basin bottom close enough to the basin bottom to ensure the bottom edge remains submerged during fountain operation preventing debris and detritus floating in the water in the basin from entering the intake.

Where the fountain cover includes a spillway, the spaced apart outer edges of the cover can be the same as or substantially the same as the width of the spillway such that the outer edges of the cover can also define at least part of the outer edges of the spillway. Such a spillway can also extend downwardly toward the basin bottom with the bottom edge of the cover also defining the bottom edge of the spillway. At least one of the side edges can also extend downwardly to the basin bottom defining a foot upon which the cover can rest on the basin bottom when the cover is assembled to the basin during fountain assembly. In a preferred embodiment, spillway includes or is defined by a pair of side edges of the cover that each extends downwardly along opposite sides of the basin sidewall to the basin bottom defining a pair of spaced apart feet between which the intake-defining bottom edge of the spillway extends.

The fountain cover has a rear wall that includes an integrally formed basin seat that registers with part of the top edge of the basin sidewall extending along the rear wall and that extends to opposite side edges of the spillway. The basin seat is formed by a bottom outer edge of the rear wall of the cover that rests on the top edge of the basin when the cover is seated on the basin. If the cover includes or is configured with a spillway, depending on the spillway configuration, the spillway can include or extend along at least portion of the rear wall. Such a spillway can also extend from the rear wall along a portion of each opposite sides of the basin sidewall.

Where the fountain basin has a divider underlying the cover, the divider can be a divider wall and each outside edge of the cover can terminate in a first abutment that abuts against part of the divider wall helping not only properly locate the cover on the basin which also helping to keep the cover from moving longitudinally relative to the basin in a first direction. Such a first abutment can abut against one side of the divider wall to help locate the cover on the basin and keep the cover from moving relative to the basin along a longitudinal extent of the basin (first direction). Where the cover includes a spillway, each outside edge of the spillway can terminate in such a first abutment. Each outside edge can further include a lip that extends alongside a corresponding portion of the basin sidewall abutting or adjoining the basin sidewall thereby further helping to locate the cover on the basin while also helping to prevent a cover seated on the basin from moving relative to the basin along a second direction generally transverse or perpendicular to the first direction, e.g., preventing side-to-side cover movement.

The fountain cover has at least one and can have a plurality of spaced apart second abutments that each extend downwardly from an inner surface of the cover that abut against an opposite side of the divider wall. When the cover is mounted on the basin, each one of the first abutments can be disposed on one side of the basin divider wall and each one of the second abutments can be disposed on the other side of the divider wall capturing the divider wall therebetween preventing the cover from moving relative to the basin toward or away from either end of the basin. When the cover is mounted on the basin, the lip of each outside spillway edge can extend alongside the inner surface of an adjacent portion of a respective side of the basin sidewall preventing the side-to-side cover movement.

The cover has an orifice insert-receiving opening in liquid-flow communication with a tubular fluid conduit integrally formed of part of the cover that extends downwardly from a bottom surface or underside of the cover to register with a discharge outlet of the pump during assembly of the cover onto the basin. The fluid conduit has an endless sidewall with a self-centering pump discharge outlet seating socket or receptacle integrally formed in its free end that is configured to receive and help guide the discharge outlet of the pump during assembly into telescopic engagement. In a preferred embodiment, the pump discharge outlet is or includes a nipple and the seating socket or receptacle integrally formed in the free end of the fluid conduit defines a nipple seating socket configured to receive the free end of the pump discharge outlet nipple and guide the nipple into the conduit causing the conduit to telescope over the nipple.

The pump discharge nipple seating socket has a tapered or chamfered axial edge integrally formed in the free end of the fluid conduit that permits some axial misalignment between the pump discharge nipple and the conduit during seating of the conduit on the nipple during mounting of the cover on the basin. The conduit can be further configured with a plurality of circumferentially spaced elongate ribs extending axially along the socket to the free end of the conduit. The end of each rib can also be axially inwardly tapered toward the bore formed in the fluid conduit in which the pump discharge nipple is telescopically received during assembly.

A preferred first discharge orifice is a removable or interchangeable orifice insert that includes an insert base that abuts against part of the outer surface of the cover with the base having an orifice outlet integrally formed therein in liquid flow communication with an integrally formed tubular seat of the base received in an opening in the cover that is in liquid-flow communication with the pump. The orifice outlet can be a nozzle that projects a stream of water in an arc through the air that can reach a downstream part of the spillway of the cover or even reach water in a water holder disposed at a height lower than the orifice insert. Such a water holder can be an open drinking well of the basin or a drinking bowl integrally formed in the cover or basin. If desired, the first preferred discharge orifice is an orifice insert formed with a nozzle angled to cause the stream discharged therefrom during fountain operation to arc through the air and reach water in a water holder creating a splash and/or splashing sound when water at a sufficient pressure aid/or volumetric flow rate is discharged from the pump.

A preferred second discharge orifice also is a removable or interchangeable orifice insert that includes an insert base that includes an integrally formed flow diverter that can be imperforate which overlies part of the outer surface of the cover that diverts water expelled by the pump through its tubular seat onto the spillway of the cover where it flows down the spillway into water in the open drinking well of the basin. A preferred flow diverting discharge orifice insert is configured to split the flow of water expelled from the pump into a plurality of spaced apart streams of water that flow down the cover into the open drinking well of the basin.

DRAWING DESCRIPTION

The drawings illustrate at least one preferred embodiment presently contemplated for carrying out the invention. In the drawings:

FIG. 16 is a bottom rear perspective view of the second discharge orifice embodiment;

FIG. 17 is a bottom side perspective view of the second discharge orifice embodiment;

FIG. 18 is a top side perspective view of the second discharge orifice embodiment;

FIG. 19 is a front elevation view of the first discharge orifice embodiment;

FIG. 20 is a rear elevation view of the first discharge orifice embodiment;

FIG. 21 is a side perspective view of the first discharge orifice embodiment;

FIG. 22 is a bottom plan view of the first discharge orifice embodiment;

Figure 1A:
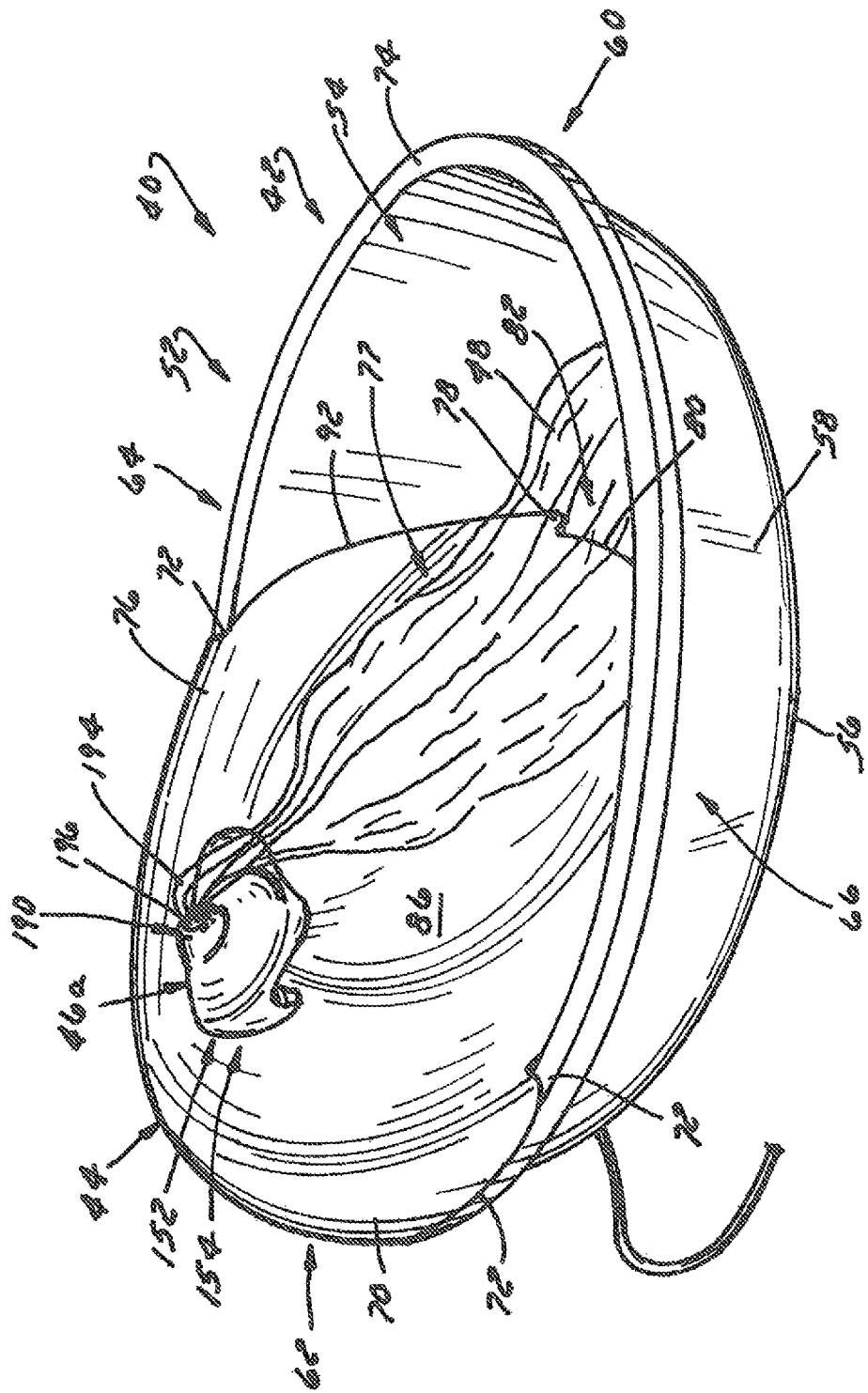
FIG. 1A is a perspective view of a recirculating pet fountain constructed in accordance with the present invention equipped with a first preferred embodiment of a flow directing discharge orifice insert mounted to a cover of the fountain having a stream of water discharged from a nozzle of the insert during fountain operation.
Figure 1B:
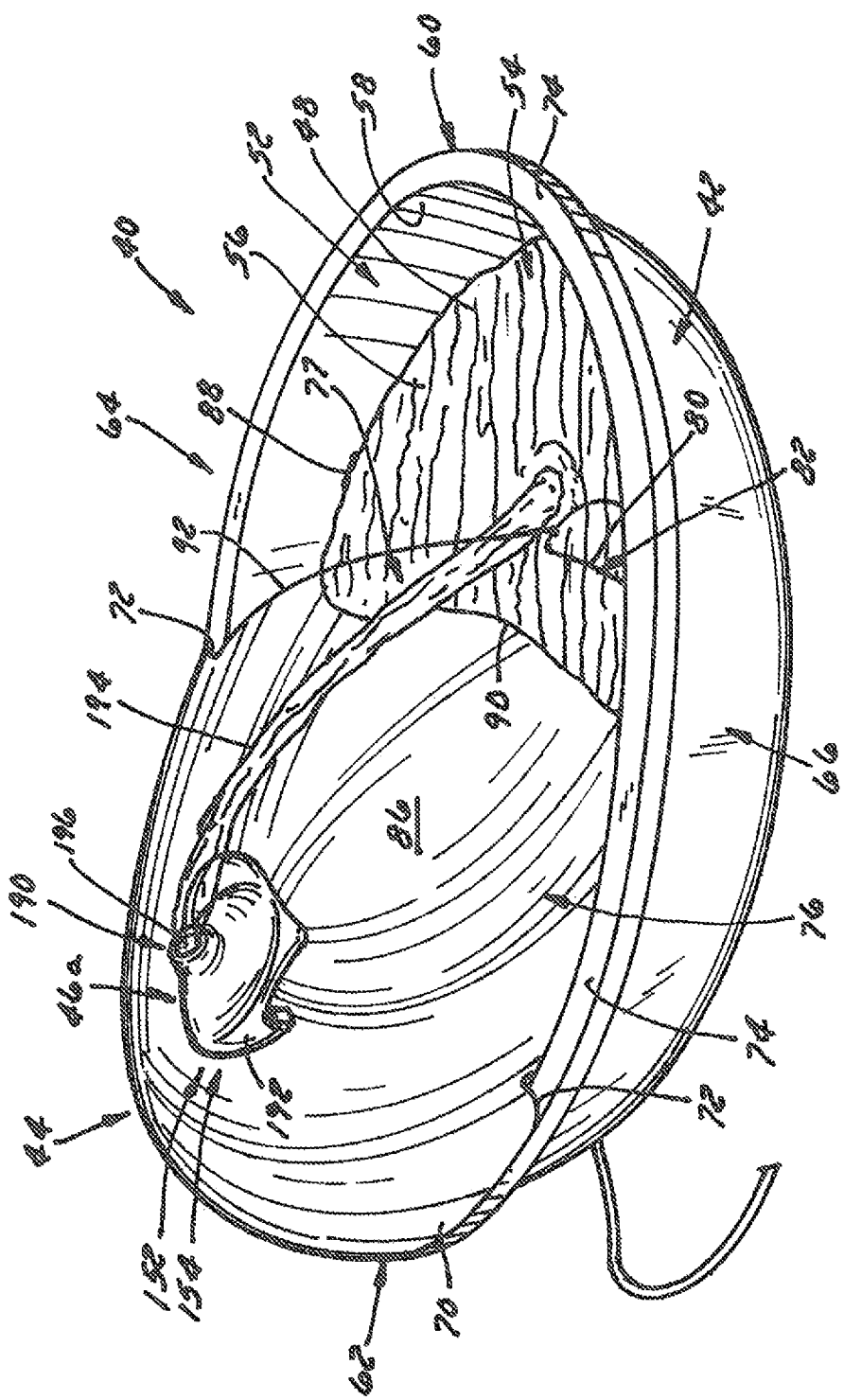
FIG. 1B is a perspective view of the pet fountain equipped with a second preferred embodiment of a flow directing discharge orifice insert configured to discharge a pair of spaced apart water streams that flows along a spillway of the fountain cover.
Figure 2:
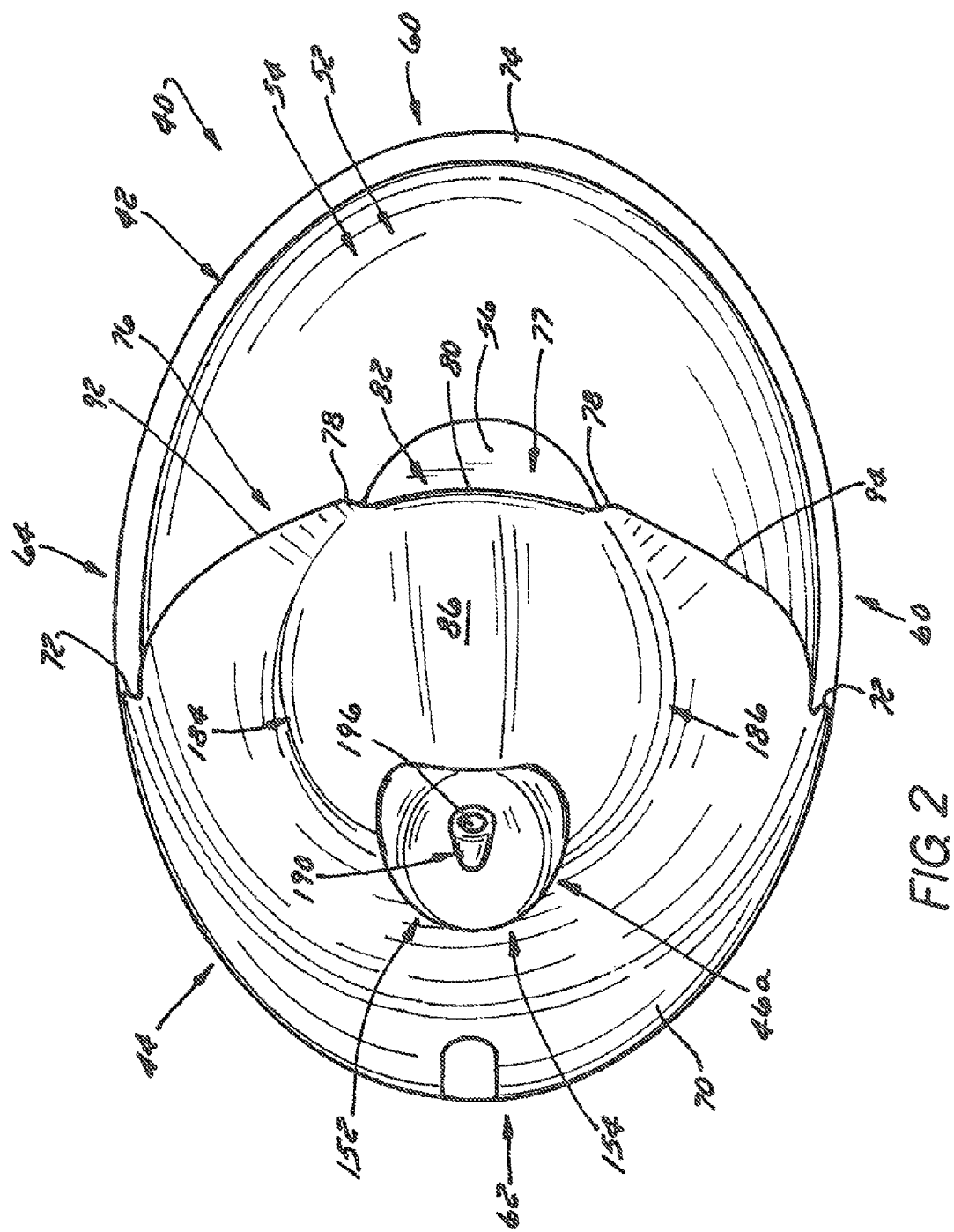
FIG. 2 is a top plan view of the fountain equipped with the first discharge orifice embodiment of FIG. 1.

Before explaining one or more embodiments of the invention in detail, it is to be understood that the invention is not limited in its application to the details of construction and the arrangement of the components set forth in the following description and illustrated in the drawings. The invention is capable of other embodiments as well as being practiced or carried out in various ways. Also, it is to be understood that the phraseology and terminology employed herein is for the purpose of description and should not be regarded as limiting.

DETAILED DESCRIPTION

FIGS. 1-24 illustrate one or more preferred embodiments of a recirculating pet fountain 40 constructed in accordance with the present invention having a fountain basin 42 that receives a fountain cover 44 configured to receive and releasably retain one of a plurality of interchangeable flow-directing discharge orifice inserts 46a and 46b that each are configured to direct a flow of water 48 received from a fountain pump 50 into a water-holding drinking howl 52 of the fountain 40 disposed lower than the discharge orifice insert 46a or 46b mounted to the cover 44 that can be an open drinking well 54 of the basin 42. The basin 42 is a bowl having a bottom 56 configured to rest on a flat surface, such as the floor, the ground, a table, or the like, from which a sidewall 58 can extend endlessly. The basin 42 can be elongated such as by being oval with the sidewall 58 having a pair of spaced apart ends 60, 62 and a pair of spaced apart sides 64, 66. The cover 44 removably mounts to the basin 42 in fluid flow registry with the pump 50 enclosing the pump 50 dividing the basin 42 into an enclosed sump 68 on one side of the cover 44 and the open drinking well 54 on the other side of the cover 44.

The cover 44 seats on the basin 42 in a manner that not only locates the cover 44 relative to the basin 42 and pump 50 during assembly, it also releasably yet securely retains the cover 44 on the basin 42 in a manner that prevents the cover 44 from moving relative to the basin 42 after it has been mounted on the basin 42. The cover 44 includes a rear wall 70 having a bottom edge 72 that rests on a top edge 74 of the basin sidewall 58 and a spillway 76 extending from the rear wall 70 that is inclined from above the basin sidewall top edge 74 downwardly toward the basin bottom 56 that can rest on the bottom 56 on a pair of feet 78 spaced apart to offset a bottom spillway edge 80 from the basin bottom 56 defining a water intake 82 through which water 48 in the basin 42 can flow from the open drinking well 54 into the sump 68 and toward the pump 50 during recirculating fountain operation.

The intake-defining bottom spillway edge 80 is disposed adjacent the basin bottom below a minimum water line 84 of water 48 needed in the basin 42 for the fountain 40 to properly work so that it works in cooperation with an inclined outer surface 86 of the spillway 76 to help prevent debris and other detritus in the water 48 from entering the sump 68 through the intake 82. With reference to FIGS. 1-4, 9A and 24, the bottom edge 80 is spaced below the minimum water line 84, preferably no higher than one-half inch from the basin bottom 56, so that the top or outer surface of water 48 in the basin 42 defined by actual water line 88 always remains above the bottom edge 80 helping to prevent floating debris and other detritus from flowing through the intake 82 into the sump 68. Such a fountain spillway construction having an integrally formed water-intake defining spillway edge 80 disposed below the surface of water 48 in the basin 42 provides a spillway configuration that enables the spillway 76 to serve as a water-flow guiding spillway while also functioning as a debris or detritus barrier 77 that prevents floating debris or detritus from passing through the intake 82 into the sump 68.

With continued reference to FIGS. 1-4, 9A and 24, the outer surface 86 of spillway 76 is inclined at an acute included angle with the basin bottom 56 in the sump 68 to space a line 90 where water 48 contacts the outer surface 86 of the spillway 76 far enough away from the bottom edge 80 so the spillway 76 functions as a barrier 77 that helps to block debris and detritus from reaching the water intake 82. Inclining the outer surface 86 of the spillway 76 at such an acute angle relative to the sump basin bottom 56 helps the spillway part of the cover 44 to function as a debris and detritus barrier 77 that prevents at least some debris and detritus from ever reaching the intake 82 including by causing at least some debris and detritus to cling to the outer spillway surface 86, particularly as the water level in the basin 42 drops over time due to animal consumption and/or evaporation.

The cover 44, including its spillway 76, has a pair of outer side edges 92, 94 extending longitudinally inboard of an adjacent side 64, 66 of a respective portion of the basin sidewall 58 helping to keep the spillway 76, which extends substantially from one side 64 to the other side 66, and hence the cover 44, from moving side-to-side toward and/or away from either side 64, 66 of the basin sidewall 58 once the cover 44 has been mounted on the basin 42. One end of at least one and preferably both of the side edges 92, 94 can terminate in a foot 78 and the other end of each side edge 92, 94 can terminate in an abutment 96 disposed adjacent an intermediate wall 98 of the basin 42 located underneath the cover 44 that can be disposed or extend between opposite sides 64, 66 of the basin sidewall 58.

Figure 8:
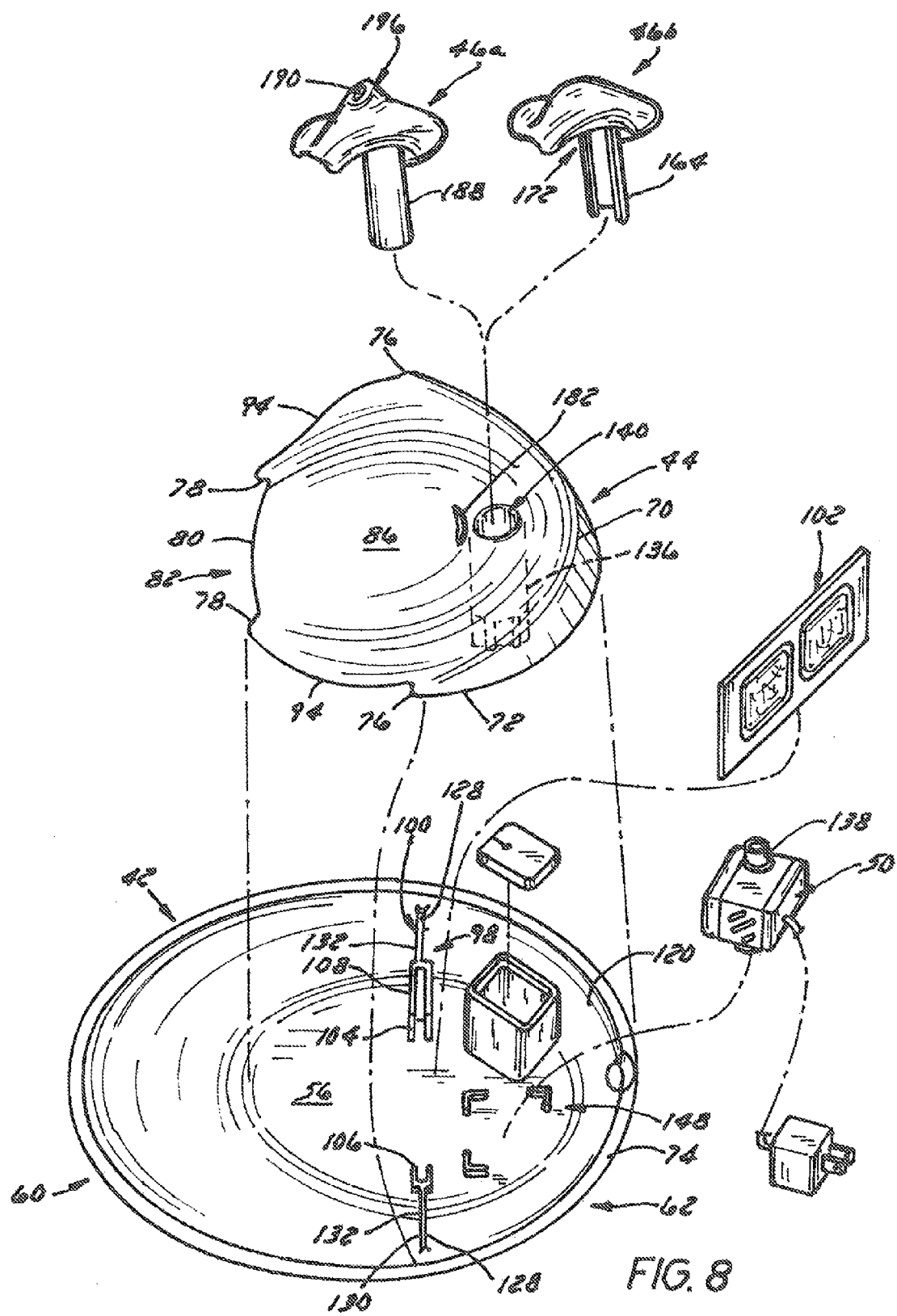
FIG. 8 is an exploded perspective view of the fountain illustrating the first and second discharge orifice embodiments.
Figure 9B:
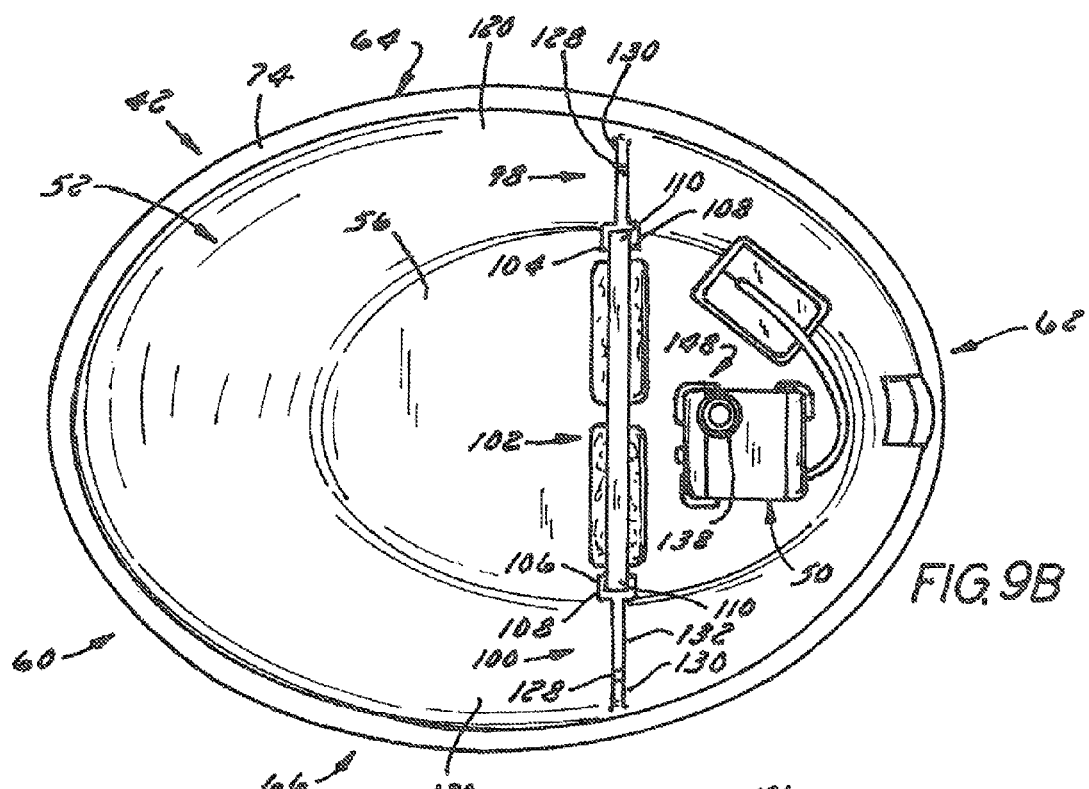
FIG. 9B is a top plan view of the fountain with the cover removed showing the interior of a basin of the fountain.
Figure 9A:
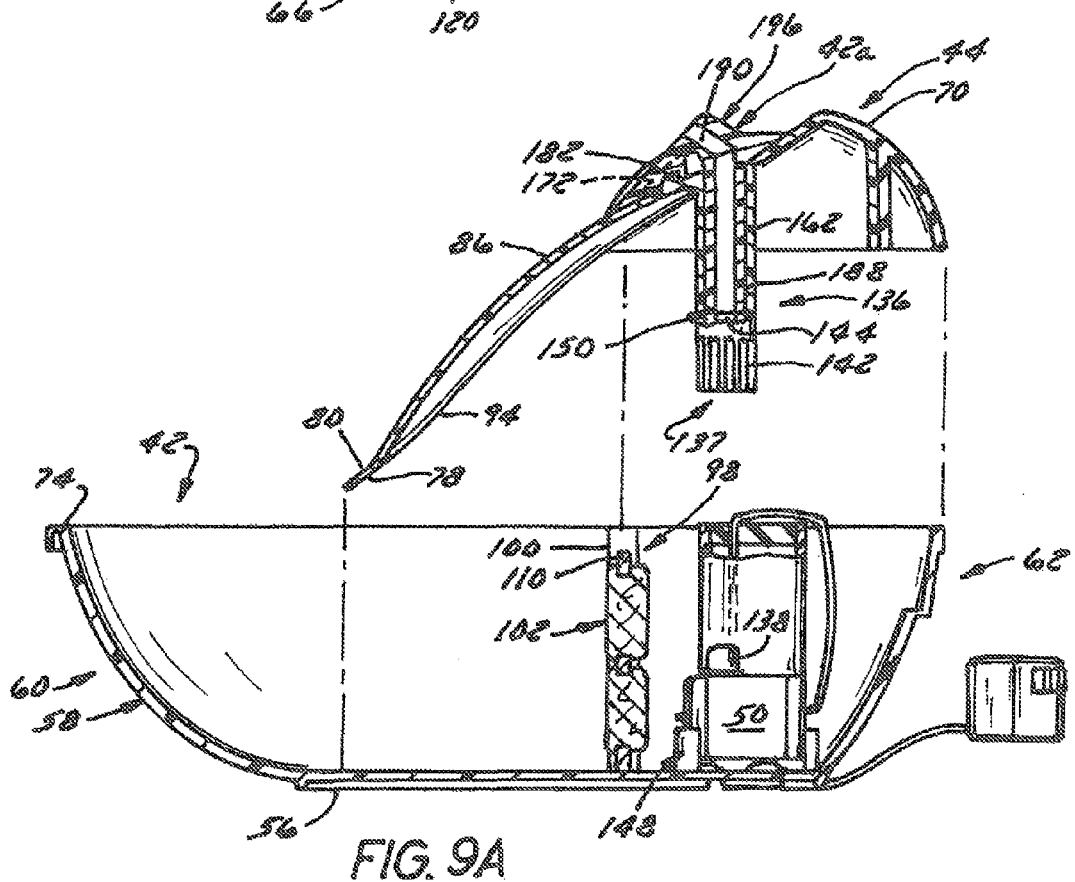
FIG. 9A is a cross-sectional side elevation view of the fountain with the first discharge orifice embodiment mounted to the cover.
Figure 10:
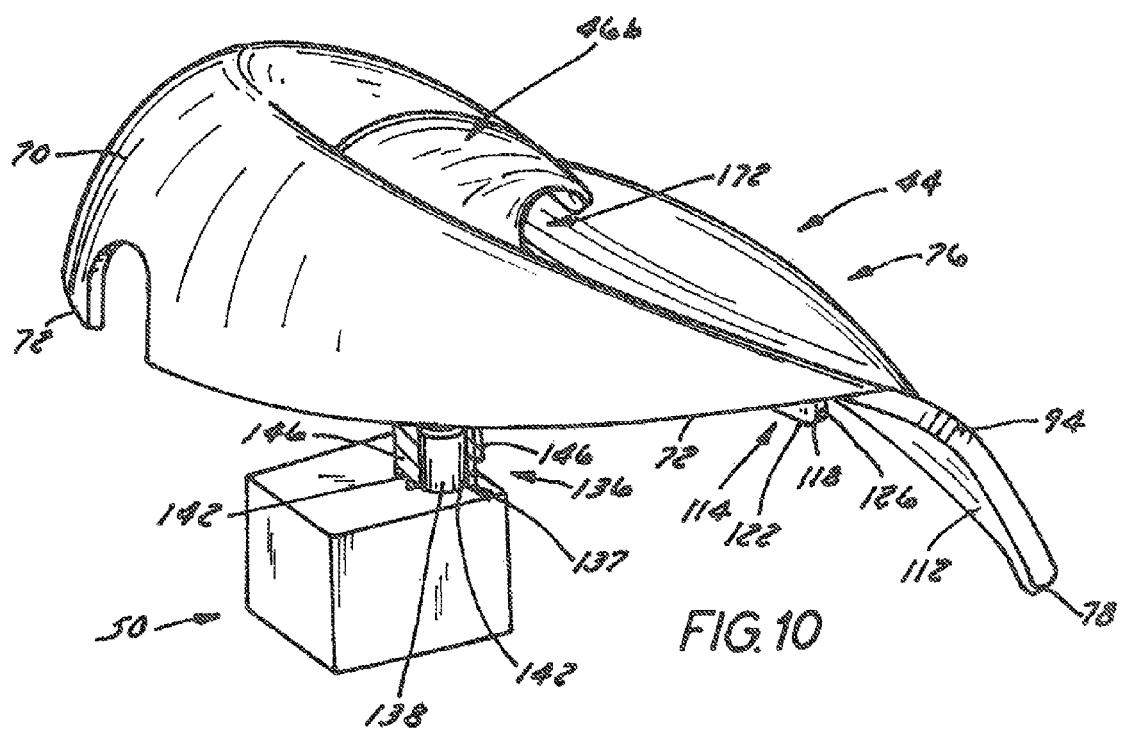
FIG. 10 is a rear side perspective view of the fountain cover mounted by a fluid-conveying conduit to a pump of the fountain.
Figure 11:
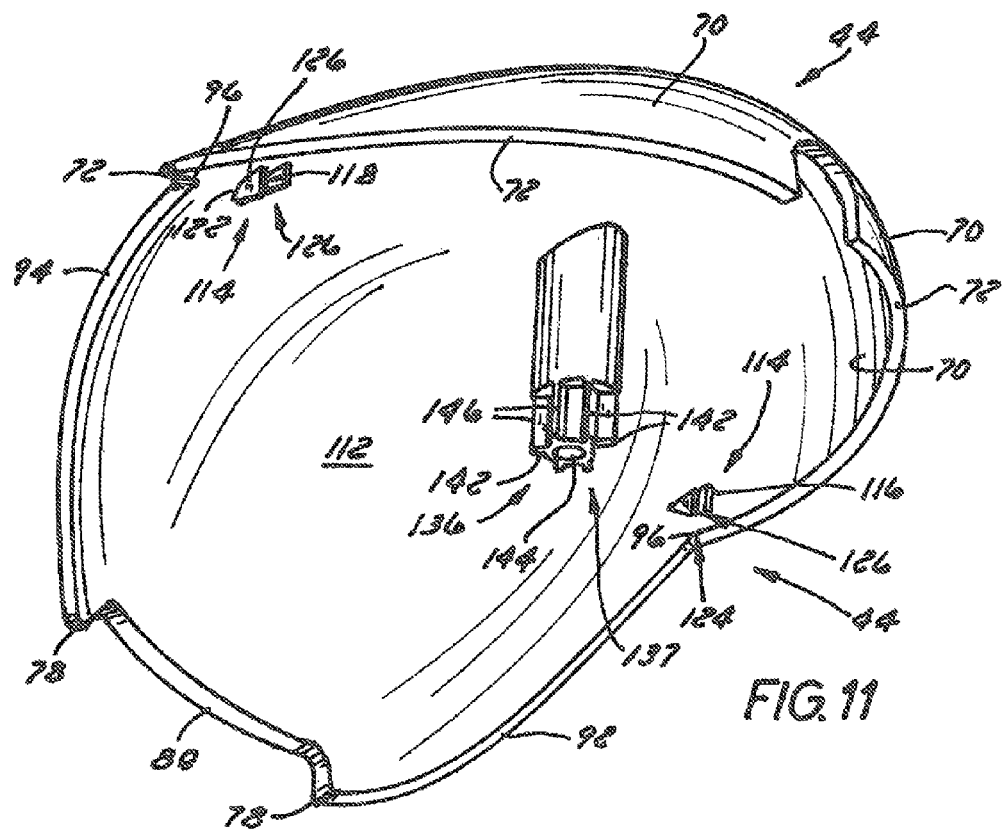
FIG. 11 is a bottom perspective view of the fountain cover.
Figure 12:
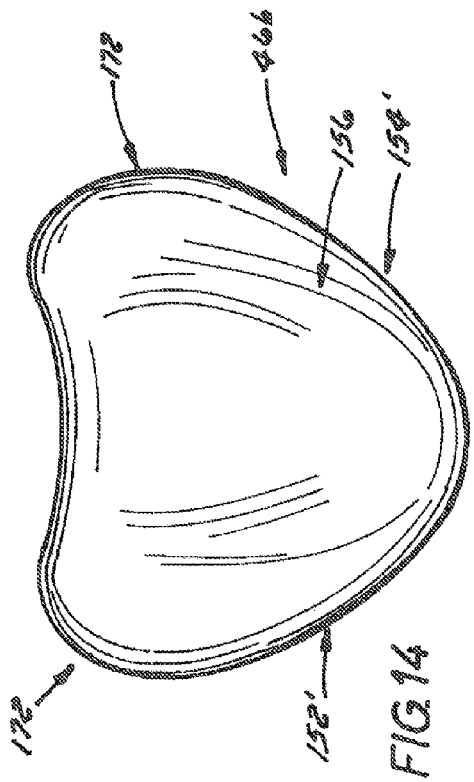
FIG. 12 is a top front perspective view of the first discharge orifice embodiment.
Figure 24:
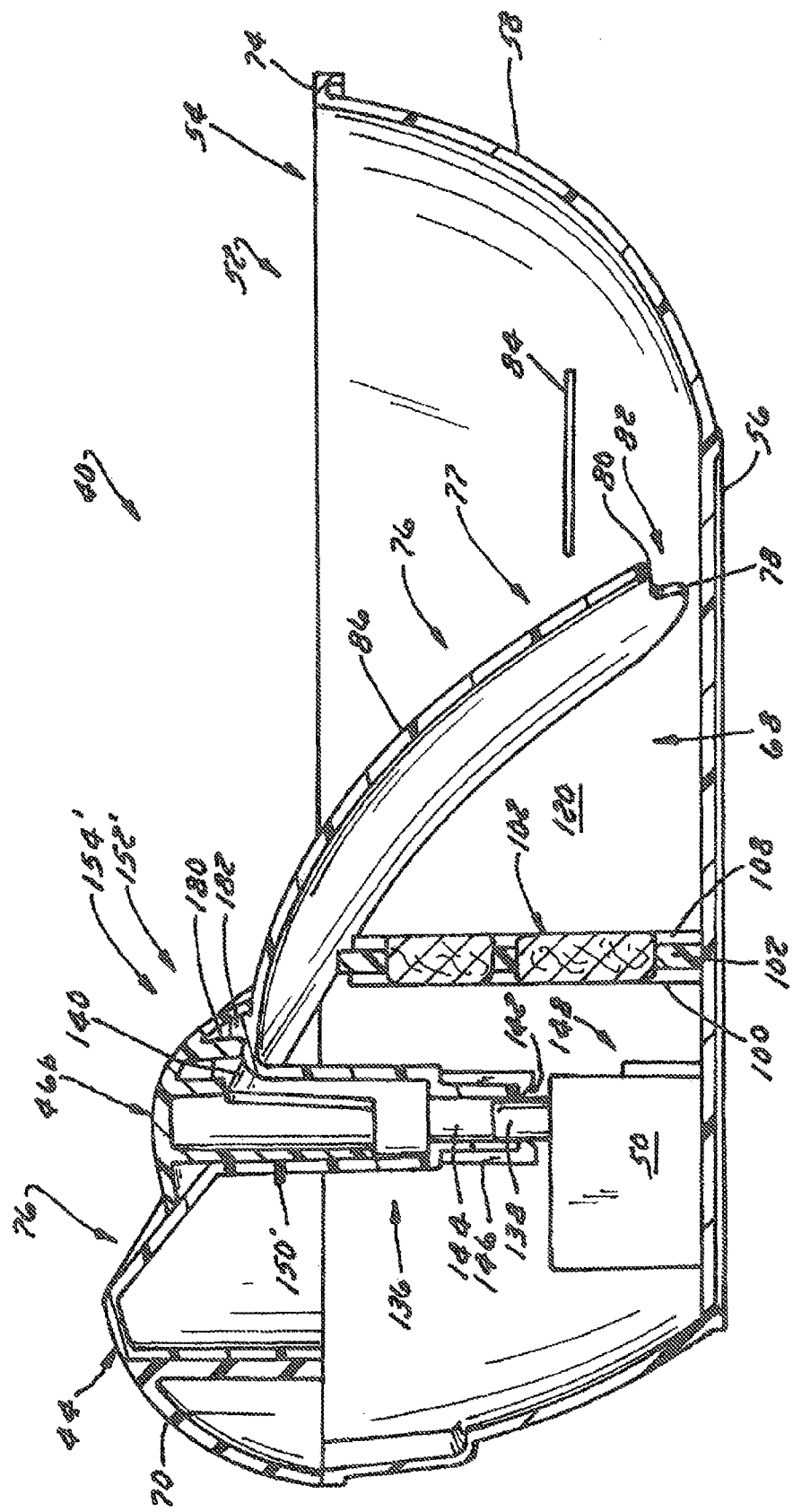
FIG. 24 is a cross-sectional side elevation view of the fountain with the second discharge orifice embodiment mounted to the cover.

In this regard, as best shown in FIGS. 8, 9A and 24, the basin 42 can include an intermediate wall 98 that is a divider wall 100 extending from one side 64 of the basin sidewall 58 to the opposite side 66 of the sidewall 58 that is configured to receive and releasably retain a replaceable filter 102 disposed between the intake 82 and pump 50. Such a divider wall 100 can be interrupted by spaced apart and opposed side edges 104, 106 formed with filter receiving channels 108 that each slidably receive and releasably retain a corresponding side edge 110 of a generally rectangular filter 102 disposed upstream of the pump 50.

The cover 44 has an inner surface 112 facing generally toward the basin bottom 56 from which at least one cover locator 114 can outwardly extend generally toward the bottom 56 that can abut against part of the divider wall 100 of the basin 42 to help prevent front-and-back movement of the cover 44 relative to the basin 42 toward a front 60 or rear 60 of the basin 42. If desired, the at least one cover locator 114 can be disposed on one side of the divider wall 100, i.e., rear side, and the abutment 96 formed by the upper end of each spillway side edge 92, 94 can be disposed on the opposite side, i.e. front side, of the divider wall 100 sandwiching the divider wall 100 therebetween preventing substantial front-and-back movement of the cover 44 relative to the basin 42 once the cover 44 has been mounted on the basin 42.

Where the cover 44 is equipped with a cover locator, the at least one cover locator 114 is formed by a pair of spaced apart locator tabs 116, 118 with one of the tabs 116 disposed inboard and adjacent to one side 64 of the basin 42 and the other one of the tabs 118 disposed inboard and adjacent an opposite side 66 of the basin 42. If desired, each locator tab 116 can be disposed alongside an adjacent portion of the inner sidewall surface 120 of a respective adjacent side 64, 66 of the basin sidewall 58 to abut against the adjacent portion of the sidewall 58 to help prevent side-to-side movement of the cover 44.

Where the cover 44 is equipped with a cover locator, another cover locator embodiment can include or otherwise have each locator tab 116, 118 being elongate and oriented generally transversely to the divider wall 100 having an outer surface 122 facing outwardly toward an adjacent portion of the inner sidewall surface 120 of a respective adjacent side 64, 66 of the basin sidewall 58 with a divider wall locator receptacle 124 formed therein that releasably receives part of the divider sideman 100 during cover attachment. Such locator tab and divider wall cooperation not only helps properly locate the cover 44 on the basin 42 during cover attachment, each tab 116, 118 also helps prevent side-to-side movement of the cover 44 relative to the basin 42 once the cover 44 has been attached. Such a locator tab construction and cooperation with the divider wall 100 can also help prevent front-and-back movement of the cover 44 relative to the basin 42 after the cover 44 has been attached to the basin 42.

Where the cover 44 is equipped with a cover locator, each locator tab 116, 118 in one preferred cover locator embodiment generally transversely overlies part of the divider wall 100 during cover attachment with the engaging receptacle 124 of each tab including a slot or channel 126 that slidably receives and engages part of the divider wall 100. With reference to FIGS. 8-11 and 24, in a currently preferred locator tab embodiment, the outer side 122 of each tab 116, 118 has a channel 126 formed therein that receives a locator edge 128 of a corresponding locator flange 130 of the divider wall 100 disposed between each tab 116, 118 and an adjacent side 64, 66 of the basin sidewall 58. In the basin embodiment shown in FIGS. 8 and 9, each locator edge 128 extends at an angle relative to a top edge 132 of the divider wall 100 that can be generally perpendicular to the divider wall top edge 132 and/or the basin bottom 56. Such a locator edge 128 can be a step or offset formed in the top edge 132 of the divider wall 100, such as is depicted in FIGS. 8, 9A, 10, 11 and 24. When each locator edge 128 is seated in a corresponding channel 126 of a respective locator tab 116, 118 of the cover 44 upon cover attachment, front and back and side to side proper cover location is ensured and side-to-side and front-and-back movement of the cover 44 relative to the basin 42 during fountain operation is also substantially completely prevented.

As should be readily apparent to one skilled in the art, the cover 44 can be constructed without any cover locator such that the cover 44 can be configured without any locator tabs. Likewise, the basin 42 can be constructed with a divider wall 100 that lacks any stepped or offset top edge 132. Where the cover 44 is constructed without any cover locator, the basin 42 can have a divider wall 100 lacking any stepped or offset top edge 132. In one preferred embodiment the cover 44 lacks any cover locator. In such a preferred embodiment, the divider wall 100 of the basin 42 can be constructed without any step or offset.

The cover 44 has a fluid-conveying tubular conduit 136 that extends downwardly from the underside 112 of the cover 44 that can extend downwardly from underneath the spillway 76. The conduit 136 telescopically engages at its free end 137 with a tubular discharge outlet nipple 138 of the pump 50 during attachment of the cover 44 to the basin 42. The conduit 136 is in fluid-flow communication with an orifice insert socket opening 140 (FIG. 23) formed in the outer surface 86 of the cover 44, preferably formed in part of the spillway 76, enabling water 48 from the sump 68 to be discharged by the pump 50 through the conduit 136 to an orifice insert 46a or 46b attached to the cover 44.

The free end 137 of the conduit 136 has an outer edge 142 that is chamfered with the angle of chamfer inclined toward a fluid conducting bore 144 formed in the conduit that helps guide the end of an axially offset or misaligned pump discharge outlet nipple 138 into telescopic engagement with the conduit 136. The conduit 136 can include a plurality of axially extending circumferentially spaced apart ribs 146 having an outer edge 142 that is also inclined toward the conduit bore 144 to help guide the pump nipple 138 into the bore 144 when attaching the cover 44 to the pump 50. The outer edge 142 of one or more of the ribs 146 can extend outwardly beyond the outer edge of the endless conduit sidewall defining the fluid conducting bore 144 to not only help guide the pump nipple 138 into substantially coaxial registry with the conduit 136 by guiding it into the bore 144, but the ribs 146 can flex and/or otherwise help better compensate for axial and radial misalignment between the nipple 138 and bore 144 during assembly. Such a construction is particularly helpful and advantageous where the pump 50 is already mounted to the basin bottom 56, such as when mounted in a pump seat 148 formed in the basin bottom 56, such as the pump seat 148 depicted in FIGS. 9A and 9B, before the cover 44 is attached.

A fountain 40 constructed in accordance with the invention can be configured to be used with one of a plurality of different but interchangeable flow directing discharge orifice inserts 46a and 46b that are each easy to mount to the cover 44 in a manner permitting removal, such as for cleaning in a dishwasher, and subsequent reattachment. Each orifice insert 46a and 46b preferably is made of a dishwasher safe material, such as a plastic, such as polypropylene, polyethylene, or the like, or an elastomeric material, such as rubber, silicone, or the like. Such an insert 46a and/or 46b can also be made of a metal, such as a stainless steel, or can be made of another material, such as a ceramic material.

With reference to FIGS. 12-22, each discharge orifice insert 46a and 46b has a male coupling stem 150 received in the coupling socket opening 140 formed in the outer surface 86 of the cover 44 removably anchoring the insert 46a or 46b to the cover 44 with the coupling stem 150 extending outwardly from a base 152 that defines a head 154 that overlies and can abut against the outer surface 86 of the cover. The orifice insert anchor stem 150 is configured to convey fluid discharged from the pump 50 through the conduit 136 in the cover 44 to the insert head 154 where water is diverted so it is directed in a desired manner toward a drinking bowl 52 disposed below the insert 46a and 46b. Such a drinking bowl 52 can be a drinking well 54 formed by an open portion of the basin 42 or by a drinking bowl integrally formed in the fountain cover, such as one or both of the upper and/or lower drinking bowls integrally formed in the cover of the recirculating pet disclosed in commonly owned U.S. Pat. No. 8,381,681, the entire disclosure of which is hereby expressly incorporated herein by reference.

FIGS. 13-18 best illustrate one preferred embodiment of an orifice insert 46b having a fluid transporting anchor stem 150' telescopically inserted into the socket opening 140 in the spillway 76 that conducts water discharged by the pump 50 against an imperforate flow directing baffle 156 formed by an inner spillway facing surface 158 of the head 154' where the water is diverted so it flows down the spillway 76 toward the drinking well 54. The fluid transporting orifice insert anchor stem 150' has a flow guiding aperture 160 formed in its sidewall 162 that helps direct water impinging against the flow diverting baffle 156 at an angle relative to the direction of water flow through the conduit 136 and stem 150' so it flows along the spillway 76.

In a preferred embodiment, the fluid transporting anchor stem 150' has a generally rectangular flow diverting aperture 160 formed in the stem sidewall 162 defining a fluid conducting conduit 164 of generally U-shaped or generally C-shaped transverse cross section. The flow diverting aperture 160 faces generally transversely outwardly relative to the flow diverting baffle 156 formed by the spillway facing inner surface 158 of the insert head 154' and extends from adjacent the inner surface 158 toward a free end 166 of the fluid transport anchor stem 150'. The flow diverting aperture 160 can extend all the way to the free end 166 of the stem 150' but can terminate before the end 166 of the stem 150' such that the stem 150' can be formed of a tube with a generally rectangular opening in it forming the flow diverting aperture that extends to adjacent the baffle 156 that can extend substantially to its flow diverting inner surface 158 if desired. Such an aperture 160 can be a slot formed in the tube sidewall 162 with the tube having a generally C-shaped or U-shaped cross section along the slot.

When the stem 150' is inserted into the opening 140 in the outer surface 86 of the spillway 76, at least part of the aperture 160 extends outwardly beyond the outer spillway surface 86 through which water expelled by the pump 50 flows. Water exiting the exposed portion of the aperture 160 above the outer spillway surface 86 impinges against the imperforate inner surface 158 of the baffle 156 deflecting the water so it flows generally parallel to the portion of the inner spillway surface 86 underlying the insert head 154'.

The orifice insert head 154' can include a channel 168 formed that helps direct water deflected by the baffle 156 so it flows generally parallel to part of the outer surface 86 of the spillway 76 underlying and/or located adjacent the head 154'. The flow directing channel 168 integrally formed in the head 154' is formed at least in part by a channel sidewall 170 that abuts against or overlies part of the outer spillway surface 86 conveying water deflected by the baffle 156 along the channel 168 toward a channel outlet 172 from which a stream 174 of water exits that flows down the spillway 76 toward the drinking well 54.

In a preferred embodiment, one channel sidewall 170 extends between a pair of spaced apart outlets 172 and can have a generally V-shaped flow diverting section 176 downstream the aperture 160 that splits the flow of water exiting the aperture 160 into a pair of spaced apart streams 174 that each flows down the spillway 76 into the drinking well 54. The flow-splitting channel 168 can also be defined another channel sidewall 178 extending between the channel outlets 172 that also spaces the imperforate inner surface 158 of the baffle 156 that also forms the channel 168 away from part of the spillway outer surface 86 underlying the channel 168 thereby also forming part of the channel 168.

Figure 3:
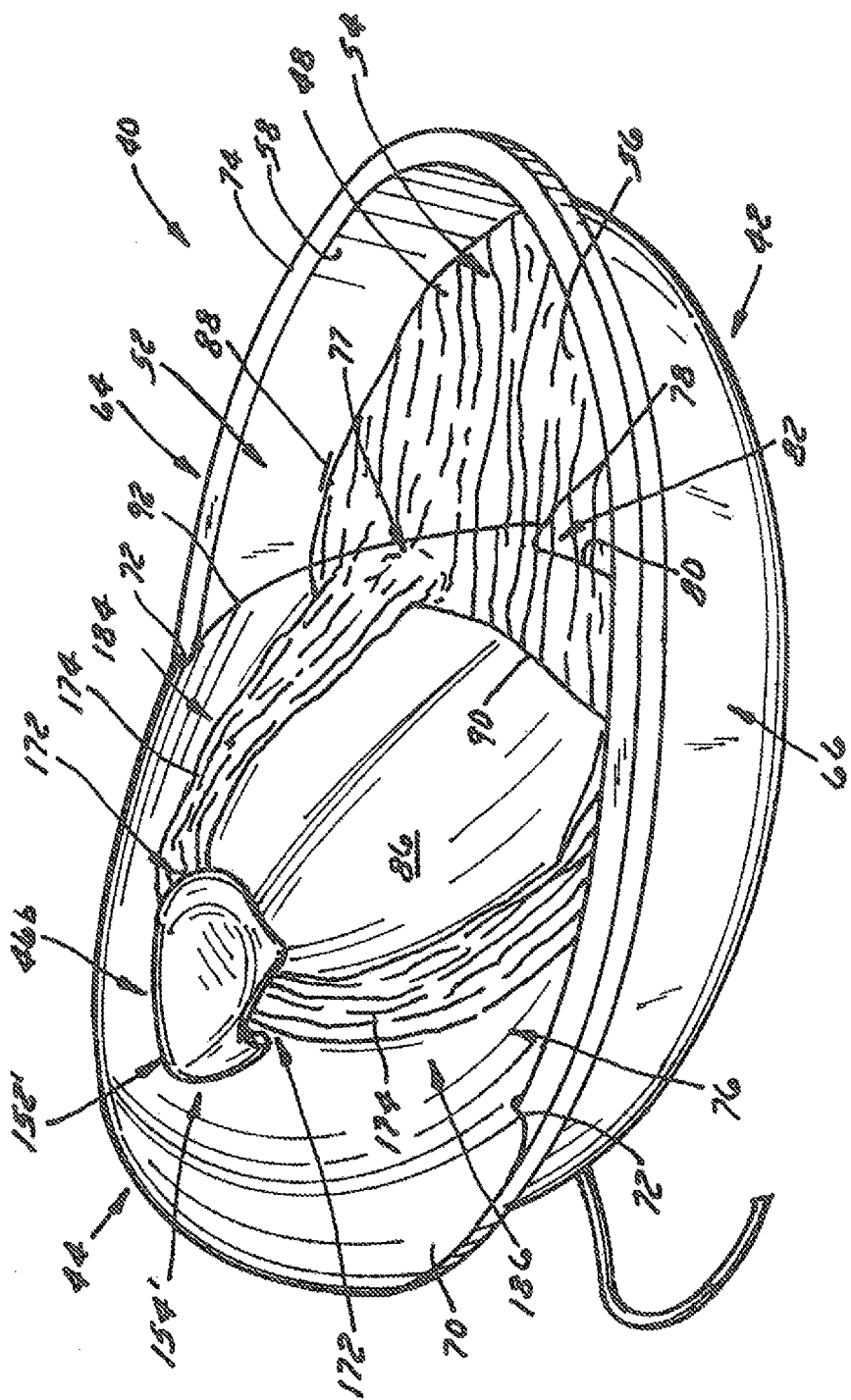
FIG. 3 is a perspective view of the fountain illustrating the second discharge orifice embodiment discharging a pair of spaced apart streams that flow down spaced apart flow guides of the spillway of the fountain cover.
Figure 13:
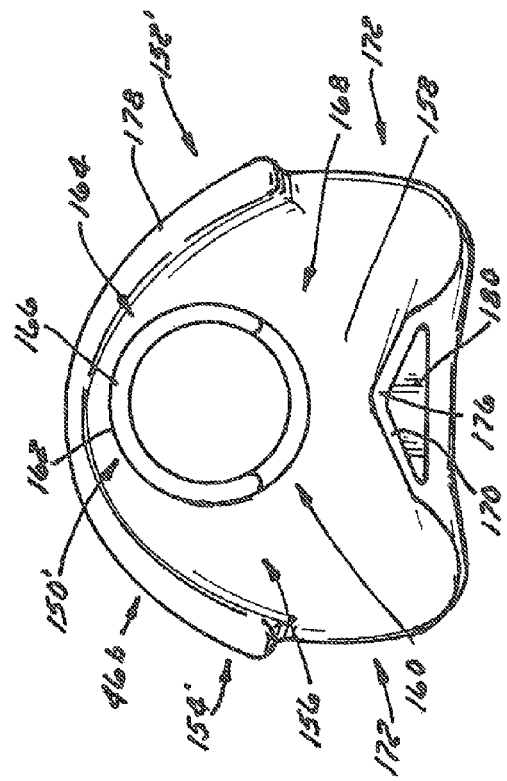
FIG. 13 is a top perspective view of the second discharge orifice embodiment.
Figure 14:
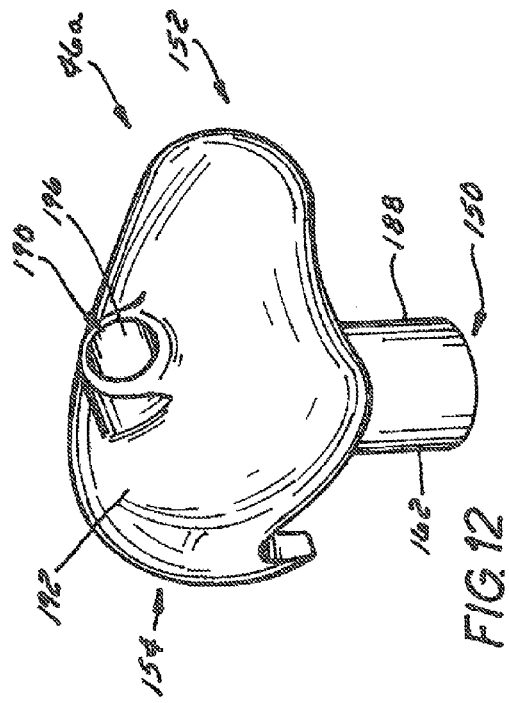
FIG. 14 is a top plan view of the second discharge orifice embodiment.
Figure 15:
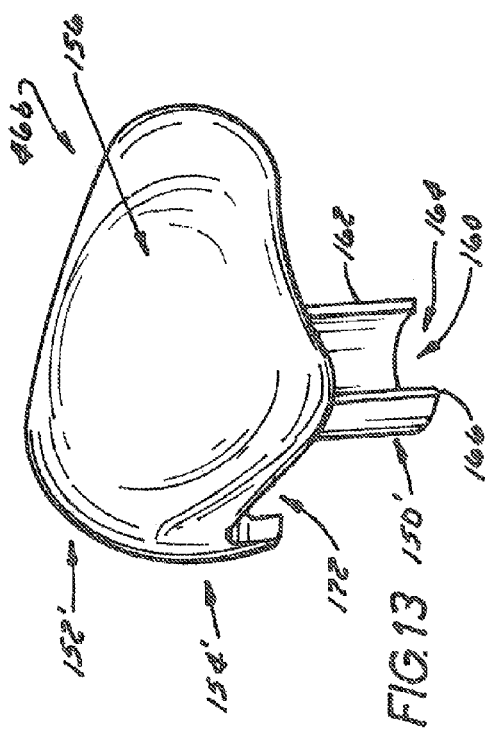
FIG. 15 is a bottom plan view of the second discharge orifice embodiment.
Figure 23:
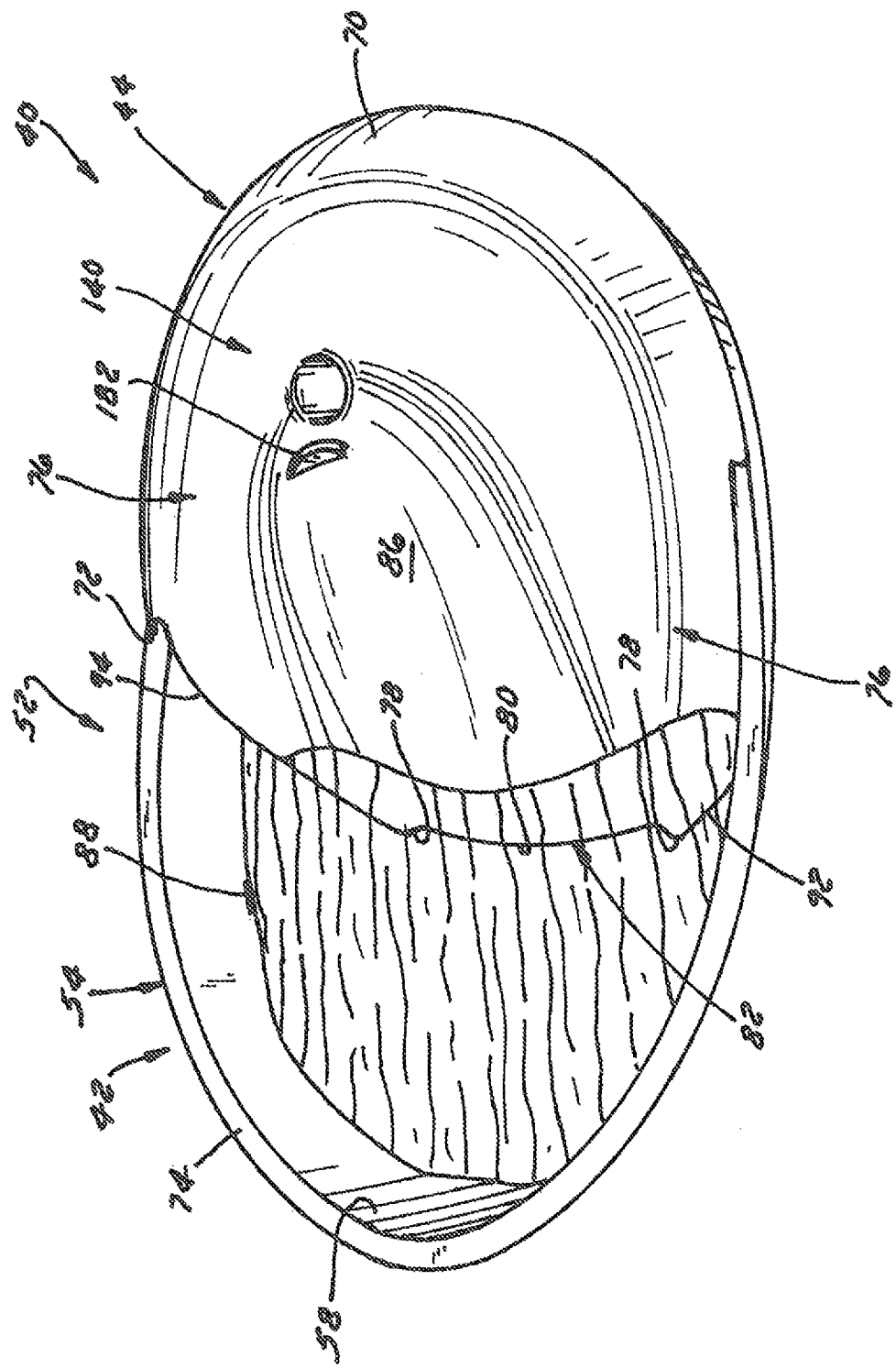
FIG. 23 is a top side perspective view of the fountain without any discharge orifice insert mounted to the cover illustrating an orifice mounting seat that includes a discharge orifice insert receiving socket opening formed in an outer surface of the cover.

The head 154' of the insert 46b can also include a pocket 180 formed adjacent the flow splitting vee 176 of the flow splitting channel sidewall 170 that seats over an upraised locator 182, such as the half-moon shaped locator 182 shown in FIG. 13, on which the insert 46b seats during attachment to the cover 44 properly locating the insert 46b so each channel outlet 172 diverts a respective water stream 174 down a corresponding one of a pair of recessed flow guiding beds 184, 186 of the spillway 76 that each guide a respective stream 174 toward a corresponding adjacent side 64, 66 of the basin sidewall 58. As best shown in FIG. 3, this causes each side 64, 66 of the basin sidewall 58 of the drinking well 54 to further guide the streams 174 when they enter the water 48 in the drinking well 54 creating swirling flow pattern of water 48 in the drinking well 54 that helps keep floating debris and detritus away from the intake 82 by helping to "beach" or wash ashore some of the debris and detritus onto the acutely inclined outer spillway surface 86.

Figure 4:
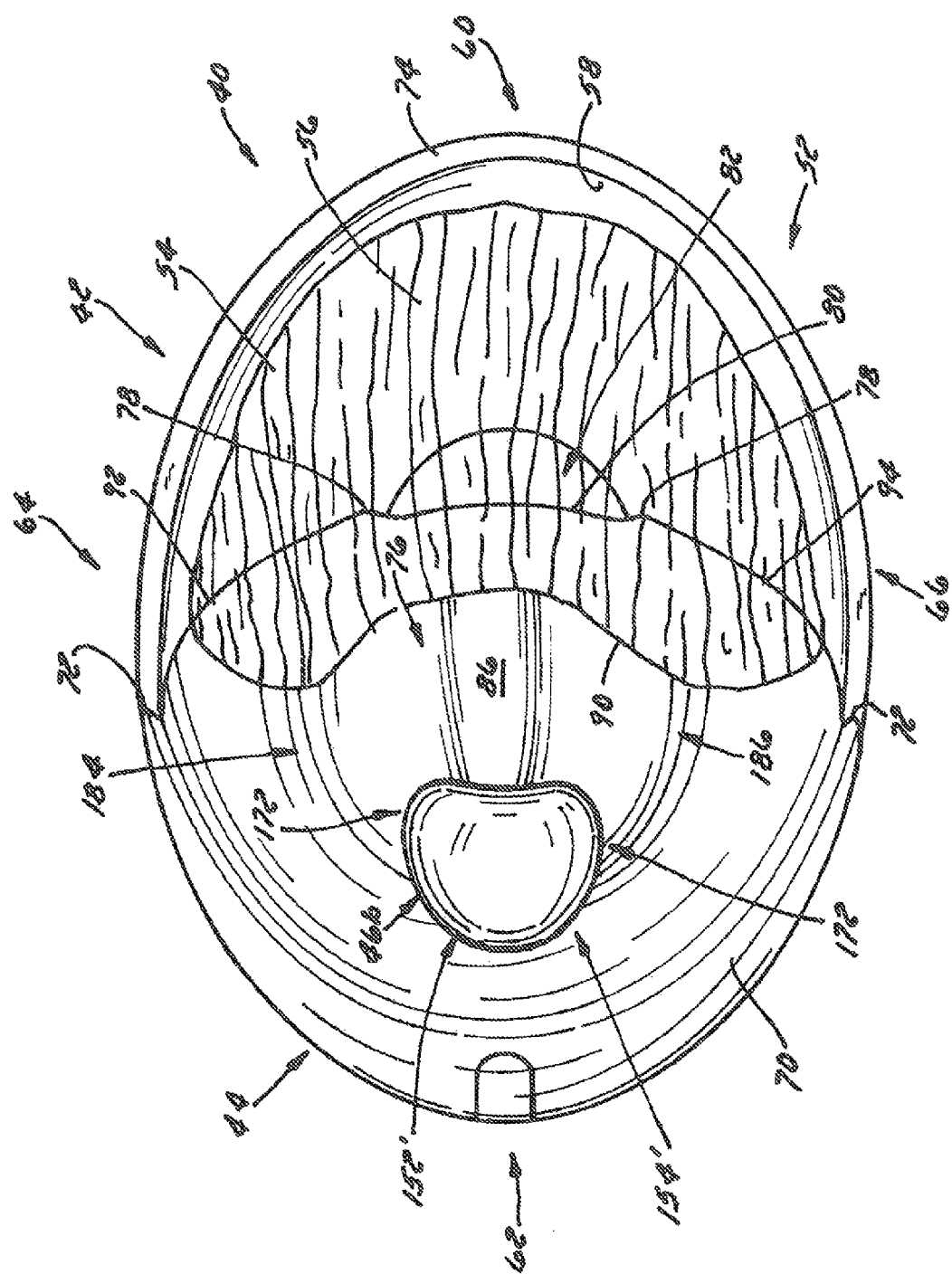
FIG. 4 is a top plan view of the fountain equipped with the second discharge orifice embodiment.
Figure 5:
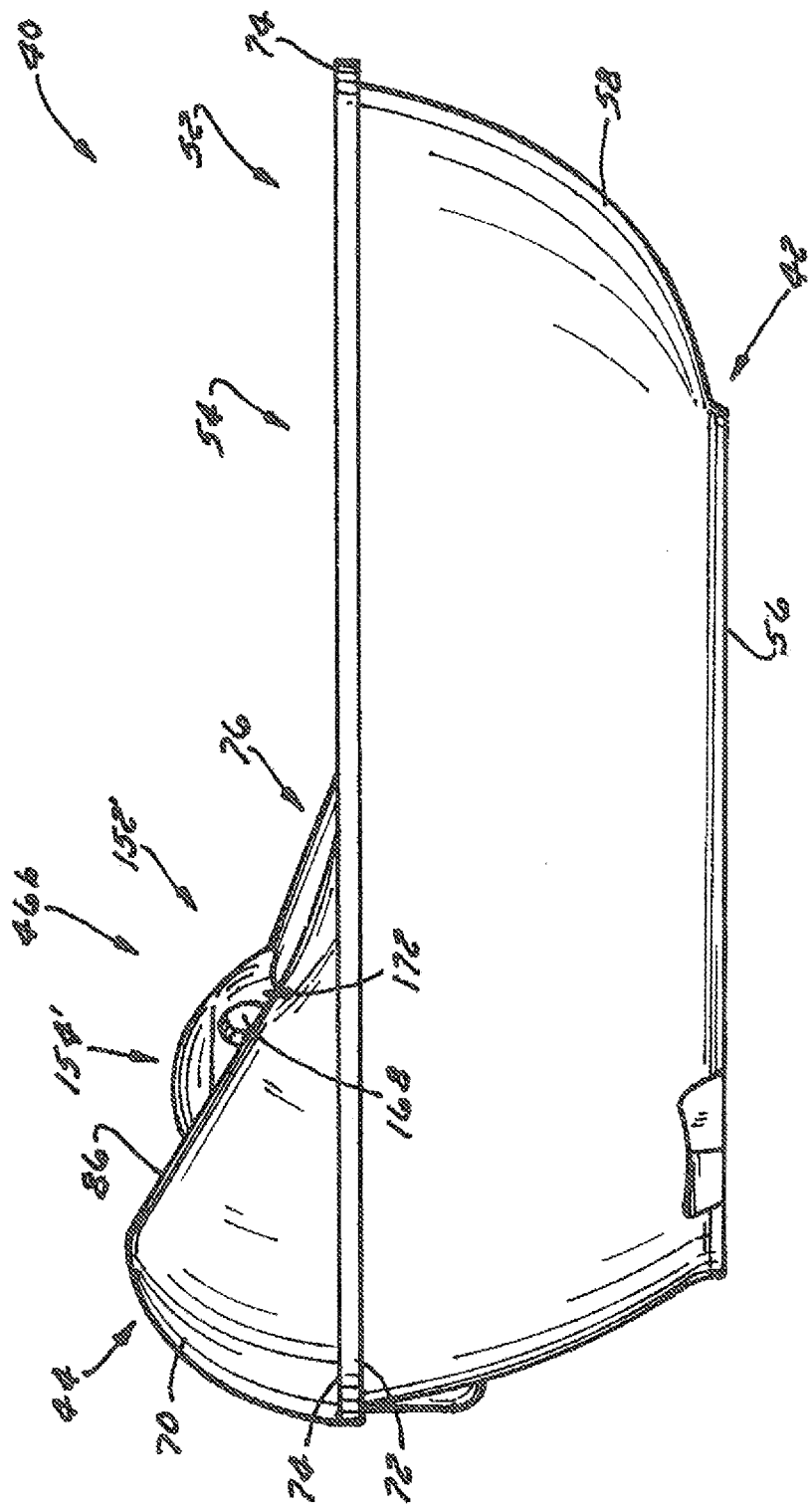
FIG. 5 is a side elevation view of the fountain equipped with the second discharge orifice embodiment.
Figure 6:
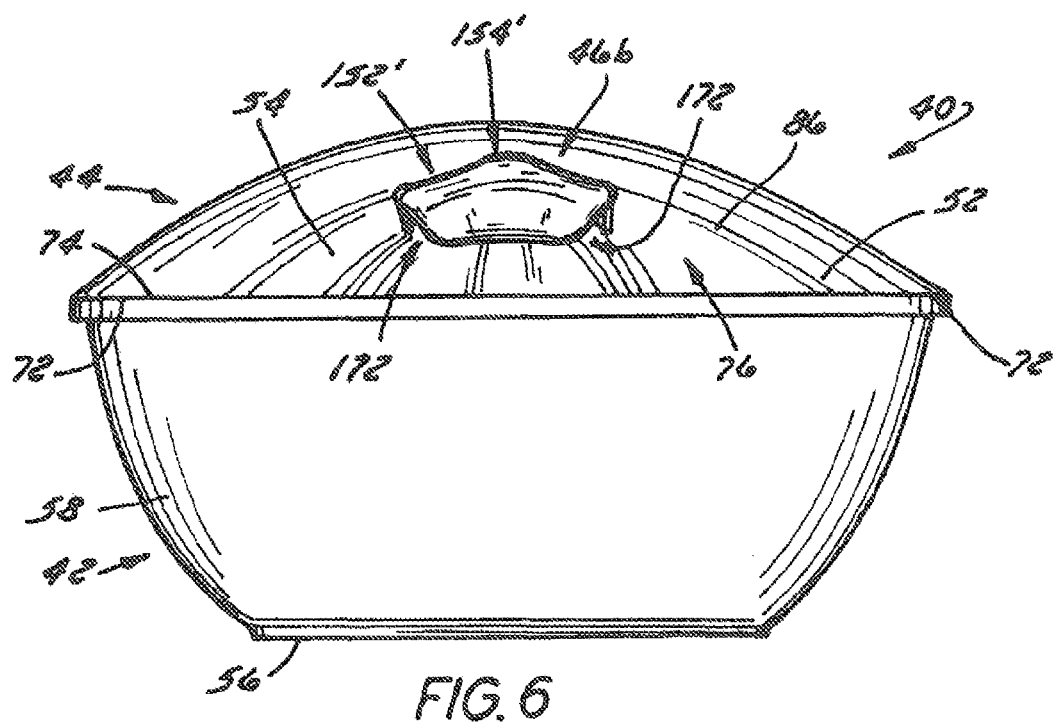
FIG. 6 is a front elevation view of the fountain equipped with the second discharge orifice embodiment.
Figure 7:
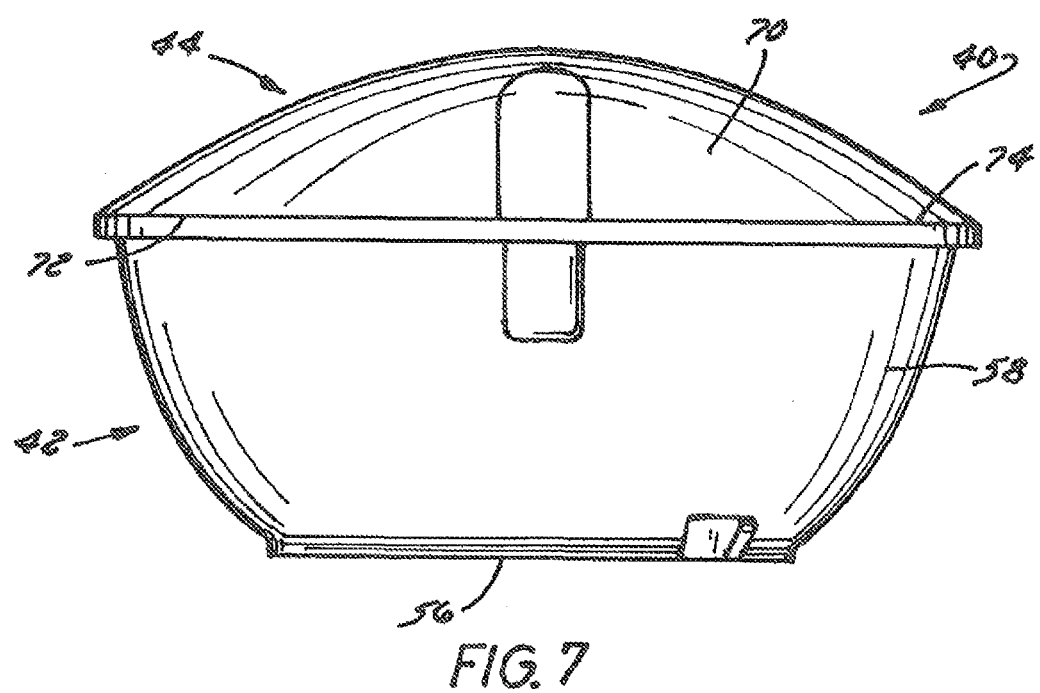
FIG. 7 is a rear elevation view of the fountain.

As best shown in FIGS. 3, 4 and 24, the discharge orifice insert 46b is oriented with its fluid diverting aperture 160 formed in its fluid conveying anchor stem 150' generally facing toward the drinking well 54 with the flow splitting channel 168 extending generally transversely to the aperture 160. Water expelled by the pump 50 out the flow diverting aperture 160 is directed by the baffle 156 and stem sidewall 162 toward the flow splitting channel sidewall 170 dividing the flow of water into a pair of separate spaced apart water streams 174 that both substantially simultaneously exit the insert 46b. Formation of each stream 174 begins along opposite branches of the channel 168 with water 48 in the orifice insert 46b flowing toward a respective outlet 172 defining the pair of streams 174 exiting the insert 46b. The streams 174 flow along the spillway 76 outwardly away from the orifice insert 46b toward a corresponding adjacent side 64, 66 of the basin sidewall 58 where the respective stream 174 flows down the spillway 76 into the drinking well 54 below.

FIGS. 1-2, 9A, 12 and 19-22 illustrate another preferred embodiment of a discharge orifice insert 46a constructed in accordance with the present invention that can be configured similar to discharge orifice insert 46b but which has a tubular anchor stem 150 formed of an endless sidewall 162 defining an elongate generally cylindrical tube 188 leading to an outlet 190 formed in an outer surface 192 of the insert head 154 that directs a water stream 194 outwardly away from the outer surface 86 of the spillway 76 toward the drinking well 54.

In the preferred discharge orifice insert embodiment shown in FIGS. 1-2, 9A, 12 and 19-22, the outlet 190 of the orifice insert 46a is defined by a nozzle 196 disposed at an angle relative to the downwardly inclined outer spillway surface 86 of the cover 44 to which the orifice insert 46a is mounted that can be generally perpendicular or even obtusely angled relative to the spillway 76. Depending on the force with which the pump 50 discharges water through the nozzle 196, as well as the angle of the nozzle 196 relative to the spillway outer surface 86, the ejected water stream 194 can travel in the air along an arc such as is depicted in FIG. 1B directly into water in the drinking well 54. Where the nozzle 196 is acutely angled relative to the outer spillway surface 86 closer to the surface 86 and/or where water 48 is expelled from the pump 50 with a lesser force or pressure out the nozzle 196, water discharged from the nozzle 196 can be delivered onto part of the spillway 76 downstream of the insert 46a upstream of water in the drinking well 54 where it flows the rest of the way down the spillway 76 into the drink well 54 below.

Although not shown in the drawings, another preferred discharge orifice insert embodiment can be of hybrid discharge orifice insert construction formed of elements of both discharge orifice inserts 46a and 46b having an aperture 160 formed in the anchor stem or tube 150 that diverts some of the water that would ordinarily flow out the nozzle 196 into a channel 168 that can be configured to split the water into a pair of spaced apart streams 174 that flow down the spillway 76 while a water stream 194 is substantially simultaneously discharged out the nozzle 196. If desired, such an orifice insert can be configured to divert some water that would ordinarily flow out the nozzle so it flows out a single outlet, such as an outlet facing directly downwardly toward the drinking well.

A fountain 40 constructed in accordance with the present invention has a basin 42 and cover 44 preferably made of a dishwasher safe material that can be a plastic, such as polypropylene, polyethylene, or the like, a metal, such as a stainless steel, or another suitable material, such as a ceramic material. The pump 50 can be a submersible pump, such as a submersible magnetic impeller driven aquarium pump that can be directly removably mounted to the basin bottom 56 by one or more elastomeric suction cups or can be part of a pump module (not shown) having a housing with a discharge outlet nipple or tube in fluid flow communication with the pump discharge outlet nipple that also telescopically engages the fluid-conveying conduit of the fountain cover 44. Such a pump 50 is connected to a source of electricity, such as by an electrical cord that is either connected by a multi-pronged plug to a source of utility alternating current electricity at a voltage greater than 100 volts AC or which is stepped down to a lesser voltage using a transformer or the like to a voltage that can be direct current voltage that is less than 25 volts that can be 12 volts or less.

The present invention is directed to a recirculating pet fountain 40 that includes a basin 42 having a bottom 56 and sidewall 58 extending upwardly therefrom, a pump 50, and a cover 44 removably carried by the basin 42 that can be removably seated on the basin 42. The fountain 40 further includes one of a plurality of different interchangeable flow directing discharge orifice inserts 46a, 46b. One of the orifice inserts 46a includes a nozzle 196 in fluid flow communication with water expelled from the pump 50 and another one of the orifice inserts 46b includes a flow diverter 176 that diverts flow of water 48 expelled from the pump 50 along part of the cover 44. The orifice insert 46b with the flow diverter 156 includes a flow splitter 176 splitting water 48 expelled from the pump 50 into a plurality of spaced apart streams 174 that flow along an exterior surface 86 of the cover 44 into the basin 42.

The discharge orifice insert 46b with the flow diverter 156 includes a tubular insert anchor 150 telescopically received in an opening 140 formed in the cover 44 in fluid flow communication with the pump 50 with the tubular insert anchor 150 having a flow diverting opening 160 in its sidewall 162 and an imperforate end wall 158 diverting water 48 generally transversely to its direction of flow from the pump 50 so it flows along the outside of the cover 44. The orifice insert 46b with the flow diverter 156 further includes a channel 168 formed in the end wall 158 having a plurality of openings 172 splitting flow of water 48 expelled from the pump 50 into a plurality of spaced apart streams 174 that flow along the outside 86 of the cover 44 into the basin 42. The part of the orifice tubular insert anchor sidewall 162 opposite the flow diverting opening 160 comprises a flow splitter 176 that splits flow of water 48 expelled from the pump 50 into a pair of spaced apart streams 174.

In an embodiment, the pet fountain 40 includes a flow diverting discharge orifice 46b having a tubular insert anchor 150 in telescopic engagement with a fluid conveying conduit 136 of the cover 44 that is in fluid flow communication with the pump 50 and a base 152' with an imperforate end wall 158 overlying the tubular insert anchor 150 diverting water 48 expelled from the pump 50 along an outer part 86 of the cover 44. In one embodiment of the flow diverting discharge orifice 46b, the end wall 158 of the flow diverting orifice 46b overlies and abuts against the outer part 86 of the cover 44 and wherein water 48 expelled from the pump 50 is diverted into a plurality of streams 174 that flow along the outer part 86 of the cover 44 into the basin 42.

In another flow diverting discharge orifice embodiment, the end wall 158 of the flow diverting orifice 46b overlies and abuts against the outer part 86 of the cover 44 and has a channel 168 that diverts flow of water 48 expelled from the pump 50 so it flows along an outer part 86 of the cover 44. The channel 168 has a plurality of outlets 172 and wherein water 48 expelled from the pump 50 is diverted into a plurality of streams 174 of water that flow therefrom. The tubular insert anchor 150 is a tube with an opening 160 adjacent the end wall 158 diverting flow of water 48 expelled from the pump 50 along a direction generally transverse to the direction of flow of the water 48 expelled from the pump 50. The tubular insert anchor 150 is telescopically received in an opening 140 in the outer surface 86 of the cover 44 that is in fluid flow communication with the pump 50.

In one embodiment of the recirculating pet fountain 40, the fountain cover 44 has a spillway 76 extending downwardly at an angle toward the bottom 56 of the basin 42 dividing the basin 42 into an open drinking well 54 in fluid flow communication with the spillway 76 and a sump 68 enclosing the pump 50. The spillway 76 is defined by a pair of spaced apart side edges 92, 94 extending along corresponding opposed portions of the basin sidewall 58. The pair of spaced apart side edges 92, 94 extending along corresponding opposed portions of the basin sidewall 58 cooperate with the corresponding opposed portions of the basin sidewall 58 in a manner that releasably retains the cover 44 on the basin 42 in a desired location relative to the basin 42.

Each spillway side edge 92, 94 can extend along an adjacent portion of an interior surface 120 of the basin sidewall 58 closest to the respective spillway side edge 92, 94 preventing side-to-side movement of the cover 44 relative to the basin 42 when the cover 44 is mounted to the basin 42. At least one of the spillway side edges 92, 94 can extend downwardly to the bottom 56 of the basin 42 comprising a foot 78 spacing a bottom edge 80 of the spillway 76 disposed below a water surface 88 of water in the basin 42 above the basin bottom 56 defining an intake 82 through which water flows from the open drinking well 54 into the sump 68 with a portion of the spillway 76 above the bottom edge 80) defining a debris and detritus obstructing barrier 77. Each one of the pair of side edges 92, 94 can extend downwardly to the bottom 56 of the basin 42 and can include a foot 78 spacing the bottom edge 80 of the spillway 76 disposed below the surface 88 of water in the basin 42 defining the intake 82 through which water flows from the open drinking well 54 into the sump 68 with the portion of the spillway 76 extending above the bottom edge 80 defining debris and detritus obstructing barrier 77.

The fountain cover 44 can include a rear wall 70 with a bottom edge 72 that rests on the upper edge 74 of the fountain basin sidewall 58. The basin sidewall 58 can include an upper edge 74 and the cover 44 can include a plurality of basin sidewall upper edge locators 114 that cooperate with respective opposed portions of the basin sidewall upper edge 74. Each basin sidewall upper edge locator 114 includes a recess 124 formed along part of an adjacent spillway side edge 92, 94 that receives an adjacent portion of the basin sidewall upper edge 74.

The fountain cover 44 can include a rear wall 70 with a bottom edge 72 that rests on the upper edge 74 of the basin sidewall 58. The bottom edge 72 of the rear cover wall 70 and each side edge 92, 94 of the spillway 76 form a basin locator seat where the bottom edge 72 of the rear cover wall 70 intersects a corresponding side edge 92, 94 of the spillway 76. The basin 42 can further include an intermediate wall 98 extending underneath the cover 44 and wherein one end of at least one of the spillway side edges 92, 94 defines an abutment 96 (FIG. 11) which is disposed on one side of the intermediate basin wall 98 and which can abut against the intermediate basin wall 98.

In a recirculating fountain embodiment, the pump 50 is releasably mounted to the basin bottom 56 and the cover 44 includes a fluid conveying tube 136 extending downwardly from an underside 112 of the cover 44 having a free end 137 of the tube 136 comprising a pump locator socket 140 configured to receive and guide a tubular discharge nipple 138 of the pump 50 into telescopic generally coaxial registry with the fluid conveying tube 136. The pump locator socket 140 can include a chamfered axial end edge 142 inclined toward a fluid-conducting bore 140 formed in the tube 136. The fluid conveying tube 136 can include a plurality of circumferentially spaced apart axially extending ribs 146 that each extend outwardly beyond the axial end 137 of the tube 136. The end of each rib 146 can be inclined toward the fluid conducting bore 140 in the tube 136.

The fountain cover 44 can include at least one cover locator 114 extending downwardly from an underside 112 of the cover 44 disposed on the opposite side of the intermediate basin wall 98 sandwiching the intermediate basin wall 98 between the spillway side edge abutment 96 and the at least one downwardly extending cover locator 114. The end of each spillway side edge 92, 94 comprises an abutment disposed on one side the intermediate basin wall 98 and wherein the at least one cover locator 114 is disposed on the other side of the intermediate basin wall 98 cradling the basin wall 98 therebetween preventing the cover 44 from moving relative to the basin 42 when the cover 44 is mounted on the basin 42 with the spillway side edge abutments disposed on one side of the intermediate basin wall 98 and the at least one cover locator 114 is disposed on the other side of the intermediate basin wall 98. The at least one cover locator 114 can be formed of a plurality of spaced apart cover locator tabs 116, 118 that extend downwardly from the underside 112 of the cover 44 with one of the cover locators 114 disposed adjacent one side 64 of the basin sidewall 58 and another one of the cover locators disposed adjacent an opposite side 66 of the basin sidewall 58.

The fountain basin 42 can further include a divider wall 100 extending from one side 64 of the basin sidewall 58 to the other side 66 of the basin sidewall 58 underneath the cover 44 that is configured to releasably receive and retain a filter 102 upstream of the pump 50. The fountain cover 44 can further include at least one divider wall locator 114 that engages a top edge 132 of the divider sidewall 100) when the cover 44 is mounted on the basin 42 preventing end-to-end movement of the cover 44 relative to the basin 42. The top edge 132 of the dividing wall 100 can extend generally horizontally having a cover locator edge 128 extending generally toward the basin bottom 56 and wherein the at least one divider wall locator 114 extending downwardly has a channel 126 formed therein that releasably receives the cover locator edge 128 therein when the cover 44 is mounted to the basin 42. The at least one divider wall locator 114 can include a tab 116, 18 extending downwardly from the underside 112 of the cover 44 overlying part of the top edge 132 of the divider wall 100 generally transverse to the divider wall 100 abutting against the cover locator edge 128 preventing side-to-side movement of the cover 44 relative to the basin 42 when the cover 44 is mounted on the basin 42. Each tab 116, 118 can have a channel 126 formed therein that receives a corresponding cover locator edge 128 formed in the divider sidewall 100 when the cover 44 is mounted to the basin 42.

The at least one divider wall locator 114 can include a pair of spaced apart tabs 116, 118 extending downwardly from the underside 112 of the cover overlying part of the top edge 132 of the divider wall 100 generally transverse to the divider wall 100 with each divider wall seat tab 116, 118 abutting against a corresponding one of a pair of spaced apart cover locator edges 128 preventing side-to-side movement of the cover 44 relative to the basin 42 when the cover 44 is mounted on the basin 42.

The cover 44 can include a pair of side edges 92, 94 respectively disposed inboard of an adjacent portion of the basin sidewall 60 terminating in abutment 96 that can abut against a corresponding portion of the dividing wall 100 when the cover 44 is mounted to the basin 42. Such a cover 44 includes a spillway 76 extending toward the basin bottom 56 defined by the pair of side edges 92, 94 disposed inboard of an adjacent portion of a respective side 64, 66 of the basin sidewall 58. Such a cover 44 further includes a rear wall 70 having a bottom edge 72 resting on an upper edge 74 of the basin sidewall 58 when the cover 44 is mounted to the basin 42.

The present invention can be and preferably is directed to a recirculating pet fountain 40 that includes a removable orifice insert 46a or 46b having a head 154 from which water exits and a mounting stem 150 received in an opening 140 in the cover 44. A plurality of interchangeable inserts 46a, 46b can be provided with one insert 46a directing a water stream 194 out a nozzle 196 onto a spillway 76 or into water 48 in a bowl 52 disposed below the insert 46a that can be a drinking well 54. Another insert 46b can be a flow dividing insert 46b that can split flow into a plurality of streams 174 directed downwardly along a pair of spaced apart recessed flow-guiding beds 184, 186 separated by an upraised hump or bubble formed in the spillway 76 toward a drinking bowl 52 or drinking well 54 of the fountain 40. During recirculating fountain operation, pump 50 draws water 48 from a sump 68 that it expels through a conduit 136 of the cover 44 to an orifice insert 46a or 46b where it flows outwardly toward the drinking bowl 52 or well 54.

Understandably, the present invention has been described above in terms of one or more preferred embodiments and methods. It is recognized that various alternatives and modifications may be made to these embodiments and methods that are within the scope of the present invention. Various alternatives are therefore contemplated as being within the scope of the present invention as defined by the claims set forth below. It is therefore also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention as defined by the claims recited herein.

What is claimed is:

1. A recirculating pet fountain comprising:
    a basin having a bottom and sidewall extending upwardly therefrom;
    a pump;
    a cover removably carried by the basin;
    a fluid-conveying conduit in fluid flow communication with the pump and the cover; and
    a flow-directing orifice comprised of (a) a tubular insert anchor in fluid-flow communication with the fluid-conveying conduit, and (b) a base comprised of an end wall that overlies (i) the tubular insert anchor, and (ii) an outer part of the cover, the end wall having a portion abutting against the outer part of the cover and which defines a channel that splits water expelled from the pump into a pair of spaced apart water streams that exit the flow-directing orifice and flow into the basin.

2. The pet fountain of claim 1, wherein the flow-splitting channel is further defined by a channel sidewall with a generally V-shaped flow-splitting vee that divides the flow-splitting channel into a pair of channel outlets from which a respective one of the water streams exits the flow-directing orifice.

3. The pet fountain of claim 1, wherein water exiting the flow-directing orifice flows along the outer part of the cover between the end wall and the outer part of the cover.

4. The pet fountain of claim 1, wherein the flow-splitting channel is further defined by the outer part of the cover, the flow-splitting channel disposed between the end wall of the flow-directing orifice and the outer part of the cover.

5. The pet fountain of claim 4, wherein the flow-directing orifice further comprises a pair of spaced apart sidewalls that further defines the flow-splitting channel with one of the sidewalls defining a pair of spaced apart channel outlets from which a respective one of the water streams exits the flow-directing orifice.

6. The pet fountain of claim 5, wherein the tubular insert anchor comprises a tube telescopically received in an opening in the outer surface of the cover that is in fluid flow communication with the pump, the tube having an aperture adjacent the end wall that guides flow of water expelled from the pump in a direction generally transverse thereto and toward the one of the sidewalls splitting the flow into the pair of water streams that exits from a corresponding one of the channel outlets.

7. The pet fountain of claim 6, wherein the one of the sidewalls comprises a flow-splitting vee that divides the flow-splitting channel into the pair of channel outlets.

8. The pet fountain of claim 7, wherein the tube of the tubular insert anchor is disposed between the spaced apart sidewalls of the flow-splitting channel.

9. The pet fountain of claim 8 wherein the fluid-conveying conduit is integrally formed of part of the cover.

10. The pet fountain of claim 1, wherein (a) the flow-splitting channel is further defined by a channel sidewall that divides the flow-splitting channel into a pair of channel outlets spaced apart by the channel sidewall, and (b) the tubular insert anchor has an aperture formed therein that guides flow of water expelled from the pump in a direction generally transverse thereto and toward the channel sidewall where the flow of water is split into the pair of water streams that exits from a corresponding one of the channel outlets.

11. The pet fountain of claim 10, wherein the tubular insert anchor comprises a tube telescopically received in an opening formed in the cover that is in fluid-flow communication with the fluid-conveying conduit, the flow-guiding aperture formed in the tube adjacent the end wall and facing toward the channel sidewall the channel sidewall being generally V-shaped.

12. The pet fountain of claim 1, wherein the outer part of the cover comprises a spillway down which the pair of spaced apart water streams exiting the flow-directing orifice flow until reaching the basin, the spillway comprising a pair of spaced apart flow-guiding beds that guide a corresponding one of the pair of water streams after exiting the flow-diverting orifice.

13. The pet fountain of claim 1 wherein the cover comprises a spillway extending downwardly at an angle toward the bottom of the basin dividing the basin into an open drinking well in fluid flow communication with the spillway and a sump enclosing the pump.

14. The pet fountain of claim 13 wherein the spillway is defined by a pair of spaced apart side edges extending along corresponding opposed portions of the basin sidewall.

15. The pet fountain of claim 14 wherein the pair of spaced apart side edges extending along corresponding opposed portions of the basin sidewall cooperate therewith in a manner that releasably retains the cover on the basin in a desired location relative to the basin.

16. The pet fountain of claim 14 wherein each spillway side edge extends along an adjacent portion of an interior surface of the basin sidewall closest to the spillway side edge preventing side-to-side movement of the cover relative to the basin when the cover is mounted to the basin.

17. A recirculating pet fountain comprising:
a basin having a bottom and sidewall extending upwardly therefrom;
a pump; and
a cover removably carried by the basin, the cover comprising a spillway extending downwardly toward the bottom of the basin dividing the basin into (a) an open drinking well in fluid flow communication with the spillway, and (b) a sump enclosing the pump;
wherein the spillway is defined by a pair of spaced apart side edges extending along corresponding opposed portions of the basin sidewall; and
wherein at least one of the spillway side edges extends downwardly to the bottom of the basin comprising a foot spacing a bottom edge of the spillway disposed below a surface of water in the basin from the basin defining an intake through which water flows from the open drinking well into the sump with a portion of the spillway disposed above the bottom edge of the spillway defining a debris obstructing barrier.

18. The pet fountain of claim 14 wherein each one of the pair of side edges extends downwardly to the bottom of the basin and comprises a foot spacing a bottom edge of the spillway disposed below a water surface of water in the basin defining an intake through which water flows from the open drinking well into the sump with a portion of the spillway above the bottom edge defining a debris and detritus obstructing barrier.

19. The pet fountain of claim 14 wherein the cover comprises a rear wall with a bottom edge that rests on the upper edge of the basin sidewall.

20. The pet fountain of claim 14 wherein the basin sidewall has an upper edge and wherein the cover comprises a plurality of basin sidewall upper edge locators that cooperate with respective opposed portions of the basin sidewall upper edge.

21. The pet fountain of claim 20 wherein each basin sidewall upper edge locator comprises a recess formed along part of an adjacent spillway side edge that receives an adjacent portion of the basin sidewall upper edge.

22. The pet fountain of claim 20 wherein the cover comprises a rear wall with a bottom edge that rests on the upper edge of the basin sidewall.

23. The pet fountain of claim 22, wherein the bottom edge of the rear cover wall intersects a corresponding one of the side edges of the spillway locating the cover on the basin.

24. The pet fountain of claim 23 wherein the basin further comprises an intermediate wall extending underneath the cover and wherein one end of at least one of the spillway side edges defines an abutment which is disposed on one side of the intermediate basin wall and which can abut against the intermediate basin wall.

25. The pet fountain of claim 1, wherein (a) the pump is releasably mounted to the basin bottom, and (b) the fluid-conveying conduit comprises a tube integrally formed of the cover that extends downwardly from an underside of the cover, the tube having a fluid-conducting bore formed therein, and the tube having a free end comprising a pump locator socket with a chamfered axial end edge inclined toward the fluid-conducting bore to receive and guide a tubular discharge nipple of the pump into telescopic generally coaxial registry therewith.

26. A recirculating pet fountain comprising:
a basin having a bottom and sidewall extending upwardly therefrom;
a pump releasably mounted to the basin, the pump having a tubular discharge nipple from which water is expelled from the pump; and
a cover removably carried by the basin, the cover having a fluid-conveying tube with a fluid-conducting bore formed therein extending downwardly therefrom, the fluid-conveying tube having a free end comprising a pump locator socket with a chamfered axial end edge of the fluid-conveying tube, the chamfered axial end edge inclined toward a fluid-conducting bore formed in the tube to receive and guide the tubular discharge nipple of the releasably mounted pump into telescopic generally coaxial registry with the fluid-conveying tube.

27. The pet fountain of claim 26 wherein the fluid conveying tube comprises a plurality of circumferentially spaced apart axially extending ribs that each extend outwardly beyond the axial end of the tube.

28. The pet fountain of claim 27 wherein the end of each rib is inclined toward the fluid conducting bore in the tube.

29. The pet fountain of claim 26, wherein the cover has a generally downwardly extending spillway with a bottom edge spaced above the bottom of the basin defining an intake spaced above the bottom of the basin through which water in an open drinking well on one side of the cover flows into a sump on the other side of the cover in which the pump is disposed.

30. The pet fountain of claim 26, wherein the cover has spillway with a pair of spaced apart flow-guiding beds that guide flow of water expelled by the pump along the flow-guiding beds into the basin creating a swirling flow pattern of water in the basin.

31. The pet fountain of claim 26, further comprising a flow-directing orifice with a tube telescopically received in an opening formed in the cover that is in fluid-flow communication with the pump and which removably attaches the flow-directing orifice to the cover, the flow-directing orifice comprised of a flow-splitter that splits flow of water expelled from the pump into a pair of water streams that flow along the cover into the basin; and wherein the cover has spillway with a pair of spaced apart, elongate and recessed flow-guiding beds that guide flow of water expelled by the pump along the flow-guiding beds into the basin creating a swirling flow pattern of water in the basin.

32. The pet fountain of claim 17, wherein the pair of spaced apart side edges extend alongside corresponding opposed portions of the basin sidewall and cooperate therewith in releasably retaining the cover on the basin.

33. The pet fountain of claim 32 wherein the cover comprises a rear wall with a bottom edge that rests on the upper edge of the basin sidewall.

34. The pet fountain of claim 17, wherein the spillway has a pair of spaced apart flow-guiding beds that guide flow of water flowing down the spillway into the basing creating a swirling flow pattern of water in the basin.

35. The pet fountain of claim 34, further comprising a flow-directing orifice that splits flow of water expelled by the pump into a pair of spaced apart water streams with one of the water streams flowing along one flow-guiding bed of the spillway and the other one of the water streams flowing along the other flow-guiding bed of the spillway.

36. The pet fountain of claim 35, wherein each one of the flow-guiding beds is comprised of a recessed portion of the cover.

* * * * *

UNITED STATES PATENT AND TRADEMARK OFFICE
CERTIFICATE OF CORRECTION

| | |
|---|---|
| PATENT NO. | : 9,572,323 B2 |
| APPLICATION NO. | : 14/021396 |
| DATED | : February 21, 2017 |
| INVENTOR(S) | : John M. Lipscomb and Qing He |

Page 1 of 1

It is certified that error appears in the above-identified patent and that said Letters Patent is hereby corrected as shown below:

On the Title Page

Insert for Item (63):
-- Continuation-in-part of U.S. Application No. 13/733,660, filed Jan. 3, 2013, now U.S. Patent No. 9,510,561, which is a continuation of U.S. Application No. 12/474,460, filed May 29, 2009, now U.S. Patent No. 8,381,685. --

In the Specification

In Column 1, Lines 8-11, following CROSS REFERENCE, please delete:
"This application claims priority in U.S. Provisional Patent Application No. 61/698,691, filed Sep. 9, 2012, the entirety of which is hereby expressly incorporated herein by reference."

And insert:
-- This application is a continuation-in-part of U.S. Application No. 13/733,660, filed Jan. 3, 2013, now U.S. Patent No. 9,510,561, which is a continuation of U.S. Application No. 12/474,460, filed May 29, 2009, now U.S. Patent No. 8,381,685, and claims priority in U.S. Provisional Patent Application No. 61/698,691, filed Sep. 9, 2012, the entirety of which are hereby expressly incorporated herein by reference. --

Signed and Sealed this
Third Day of December, 2024

Katherine Kelly Vidal
*Director of the United States Patent and Trademark Office*